United States Patent
Ankit et al.

(10) Patent No.: US 11,544,050 B1
(45) Date of Patent: Jan. 3, 2023

(54) SOFTWARE PATCH AUTOMATION

(71) Applicant: Amazon Technologies, Inc., Seattle, WA (US)

(72) Inventors: Kumar Ankit, Seattle, WA (US); Penchala Reddy Audireddy, Seattle, WA (US); Jayant Choranur Rajachar, Bellevue, WA (US); Sujatha Narasimhan, Seattle, WA (US); Mohammad Asad Ur Rehman, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/516,170

(22) Filed: Jul. 18, 2019

(51) Int. Cl.
*G06F 8/65* (2018.01)
*G06F 8/71* (2018.01)
*G06F 8/77* (2018.01)
*G06F 8/34* (2018.01)
*G06F 21/62* (2013.01)
*G06F 11/36* (2006.01)

(52) U.S. Cl.
CPC ............ *G06F 8/65* (2013.01); *G06F 8/34* (2013.01); *G06F 8/71* (2013.01); *G06F 8/77* (2013.01); *G06F 11/3668* (2013.01); *G06F 21/629* (2013.01)

(58) Field of Classification Search
CPC .......... G06F 8/70; G06F 8/65; G06F 11/3684; G06F 8/34; G06F 8/71; G06F 8/77; G06F 11/3668; G06F 21/629; G06F 8/30; G06F 8/60; G06F 8/20; G06Q 10/06; G06Q 10/067
See application file for complete search history.

(56) References Cited

U.S. PATENT DOCUMENTS

| | | | |
|---|---|---|---|
| 6,161,218 A | 12/2000 | Taylor | |
| 6,289,509 B1 | 9/2001 | Kryloff | |
| 6,477,703 B1 | 11/2002 | Smith et al. | |
| 6,594,822 B1 | 7/2003 | Schweitz et al. | |
| 6,952,823 B2 | 10/2005 | Kryloff et al. | |
| 7,073,172 B2 | 7/2006 | Chamberlain | |
| 7,823,148 B2 | 10/2010 | Deshpande et al. | |
| 8,423,993 B2 | 4/2013 | Faus et al. | |
| 2004/0003266 A1* | 1/2004 | Moshir | H04L 63/0236 713/191 |

(Continued)

OTHER PUBLICATIONS

Hoon Choi et al.; Coware Pipelining for Exploiting Intellectual Properties and Software Codes in Processor-Based Designs; IEEE; pp. 153-157; retrieved on Jul. 20, 2022 (Year: 2000).*

(Continued)

*Primary Examiner* — S. Sough
*Assistant Examiner* — Cuong V Luu
(74) *Attorney, Agent, or Firm* — Robert C. Kowert; Kowert, Hood, Munyon, Rankin & Goetzel, P.C.

(57) ABSTRACT

A graphical user interface is used to present one or more candidate patch target stages of a software development pipeline. Prior to deployment of a patch to a particular stage, an operation is performed to verify that a version of a deployed software at the particular stage has not changed since a record of a state of the particular stage was obtained. The deployment of the patch to the particular stage is initiated when the version of the deployed software has not changed.

20 Claims, 14 Drawing Sheets

(56) References Cited

U.S. PATENT DOCUMENTS

| | | | | |
|---|---|---|---|---|
| 2014/0282399 | A1* | 9/2014 | Gorelik | G06F 8/71 |
| | | | | 717/122 |
| 2015/0378717 | A1* | 12/2015 | Jacob | G06F 11/3688 |
| | | | | 717/124 |
| 2016/0070565 | A1* | 3/2016 | Kaneki | G06F 8/70 |
| | | | | 717/101 |
| 2017/0168800 | A1* | 6/2017 | Isaacson | H04L 67/34 |
| 2018/0060066 | A1* | 3/2018 | Rihani | G06F 8/71 |
| 2018/0173525 | A1* | 6/2018 | Suparna | G06F 8/00 |
| 2018/0276584 | A1* | 9/2018 | Woulfe | G06F 8/77 |
| 2018/0349129 | A1* | 12/2018 | Ju | G06F 8/654 |
| 2019/0227793 | A1* | 7/2019 | Ramasamy | G06Q 10/06398 |
| 2020/0034167 | A1* | 1/2020 | Parthasarathy | G06F 8/65 |
| 2020/0042648 | A1* | 2/2020 | Rao | G06F 8/20 |
| 2020/0050447 | A1* | 2/2020 | Yoshimi | G06F 3/067 |

OTHER PUBLICATIONS

L. Anneberg et al.; Petri Net Approach To Software Development Under Pipeline and Parallel Processing Architectures; IEEE; 4 pages; retrieved on Jul. 20, 2022 (Year: 1990).*

AWS, "AWS CodePipeline—API Reference", API Versions Jul. 9, 2015, pp. 1-205.

GoCD, "Concepts in GoCD—GoCd User Documentation", retrieved from https://docs.gocd.org/current/introduction/concepts_in_go.html on May 30, 2019, pp. 1-26.

IBM, "UrbanCode—Products—UrbanCode", Retrieved from https://developer.ibm.com/urbancode/products/ on May 30, 2019, pp. 1-7.

* cited by examiner

Example factors influencing target stages for patch injection 1110 (may be used by patch automation tools to recommend target stage)

Defect impact estimate 1112 (e.g., does defect slow down purchases at e-retail web site?)

Testing breadth requirement estimate 1114 (e.g., is defect in an environment-specific part of the code)

Size of patch 1116 (e.g., number of source code files/ packages involved)

Production deployment schedule 1118 (e.g., is defect in code to be released in T days?)

Potential reversion-related analysis 1120 (e.g., could code changes of patch be overwritten/ reverted because of conflicting changes in earlier stages?)

SOFTWARE PATCH AUTOMATION

BACKGROUND

In recent years, more and more large software applications and services are being run using distributed sets of interconnected resources, for example in cloud-based data centers, thereby reducing the need for application owners to maintain expensive application execution environments at their own premises. In some cases, a sophisticated application or service may utilize multiple components or modules that are developed by several different software development teams, often including dozens or hundreds of developers distributed across several locations in different time zones.

Complex software applications, such as web sites of large e-retail enterprises which are intended to concurrently serve thousands of customers in numerous countries, are typically deployed only after the software has undergone multiple types of testing. The process for introducing a new version of such software is often organized as a multi-stage pipeline, with different types of tests being performed at various stages, and multiple levels of approval required before the new version is eventually deployed in a production environment. In some cases, depending on the set of new features being introduced, it may take a long time (e.g., weeks) between the time that code changes for an application release are committed, and the time that the application release is deployed to production.

Defects or bugs may be identified at any of the stages of a software development and deployment pipeline, and of course also after an application has been deployed to production. In some cases, defects may have to be remediated using "patches" (changes to only a small subset of the overall code base of the application, which do not necessarily have to pass through all the stages of the pipeline being implemented for the application). An incremental feature to be included in an application may sometimes be identified relatively late in the development or testing cycle, and a patch may be used to add such a feature to the application (e.g., because passing the feature through all the stages of the pipeline may take too long for a deadline to be met); as such, not all patches may necessarily be associated with identified defects. In some conventional software development environments, patches may be introduced into the code base and deployed using a potentially error-prone methodology involving many different command-line driven operations, which can lead to problems such as delays in the resolution of defects, delays in the introduction of important features, or even the inadvertent introduction of new defects.

BRIEF DESCRIPTION OF DRAWINGS

FIG. 11 illustrates example factors that may be taken into account to determine the target stage of a pipeline into which a patch is to be inserted, according to at least some embodiments.

Figure 1:
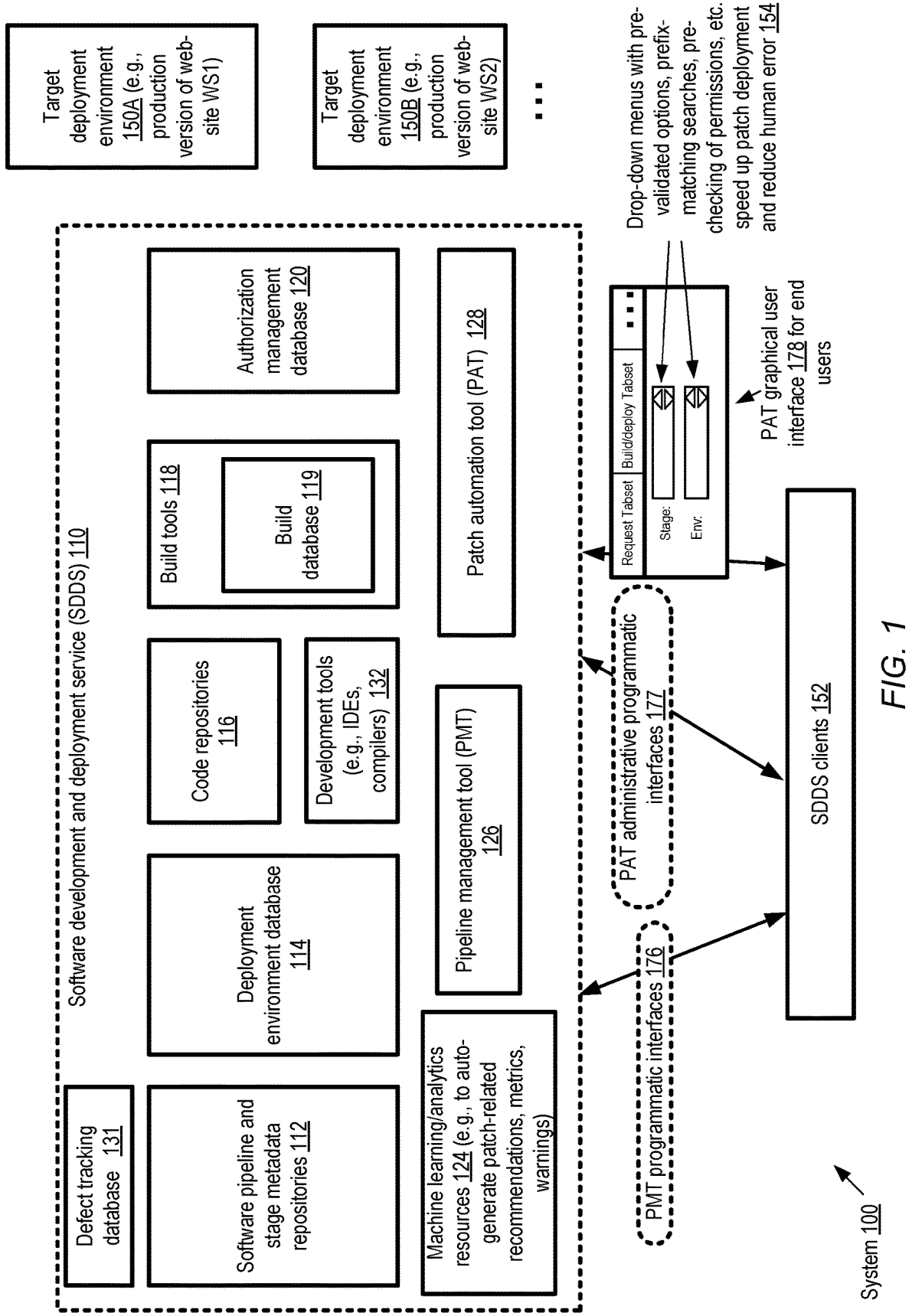
FIG. 1 illustrates an example system environment in which a patch automation tool may be implemented at a software development and deployment service, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

Various embodiments of methods and apparatus for automating the process of introducing, testing and deploying software patches for complex applications, thereby reducing the time taken for remediating software defects or for introducing incremental features, and also reducing the probability of erroneous code being injected into the applications, are described. To simplify the presentation, in much of the following description, remediating identified defects is offered as the primary example reason for generating and deploying patches, even though patches may be employed for various additional reasons in at least some embodiments, such as adding features late in the development or testing process, enhancing performance, and the like. Note that the automation techniques discussed herein may be used with equal success in various embodiments regardless of the specific reasons for the patch. According to some embodiments, a set of one or more tools, referred to as patch automation tools (PATs), implemented at one or more computing devices of a software development and deployment service (SDDS) may implement one or more graphical user interfaces (GUIs) which can be used to automate the patch-related tasks of developers, support engineers and the like, e.g., by guiding such users through various phases of injecting and deploying patches without requiring error-prone command line based interactions.

Back-end components of a PAT may connect to a variety of data sources for the applications being managed using the SDDS in various embodiments, such as a pipeline metadata repository, a software code repository, a database of deployment environments, authorization management databases, and the like, and use information contained in the data sources to pre-select candidate options for various choices to be made using the front-end components of the PAT (e.g., the GUIs). The pipeline metadata repository may, for example, contain representations of various approved or registered pipelines for testing and deploying versions of numerous applications, and each of the pipelines may in turn comprise several different testing and approval stages. The authorization database may contain permissions, indicating the kinds of patch-related operations (e.g., builds, deployments, code check-ins and branching, etc.) that various users are permitted to initiate. Using the pipeline metadata repository and the authorization database, back-end components of the PAT may for example identify candidate target stages at which a given patch can be injected or introduced by a given user, and provide an indication of only the valid candidate target stages via a GUI. Generally speaking, a PAT may perform at least the following kinds of operations (among others) in various embodiments: (a) guiding a user through various mandatory steps of a patch injection and deployment process in the correct sequence, preventing the user from attempting operations out of order, (b) identifying and presenting valid options for selection decisions to be made by a user at various steps of the patch process, (c) dynamically changing/selecting additional GUI elements based on data entered previously by a user and/or based on the identity of the user, (d) notifying a user, before a request for a given patch related operation is submitted by the user, whether the user has permission to request the task, (e) providing dynamically updated notifications regarding the status of various patch related operations (such as builds or deployments), (f) verifying that the state of a deployment environment to which a patch is to be deployed has not changed, since the time at which the patch was initiated, in a way that would prevent the successful deployment of the patch, (g) generating log records, in a consistent format, indicating the tasks that were initiated and/or the information that was provided to PAT users, and so on. In at least some embodiments, a PAT may also provide more enhanced services, such as recommendations for target stages into which a patch should be introduced, streamlining the process of obtaining permissions for various tasks, providing warnings if a user attempts to attempt a patch related operation that may not be optimal, and so on. The set of operations performed at an SDDS with respect to a particular patch may be referred to as a patch workflow or patch management process in some embodiments.

As one skilled in the art will appreciate in light of this disclosure, certain embodiments may be capable of achieving various advantages and practical applications/benefits, including some or all of the following: (a) reducing the computation, storage, networking and other resources that have to be employed to successfully fix defects identified during various phases of software development and deployment pipelines, e.g., by preventing human errors that require work to be redone, (b) enhancing the user experience of support engineers, software developers and the like tasked with responding to detected software defects using patches, and (c) providing improved records of patch related operations, which in turn may be analyzed and used to enhance software development processes to reduce defects in the long run.

According to one embodiment, a system may comprise one or more computing devices, e.g., comprising respective hardware and software components collectively used to implement various functions and tools of a software development and deployment service (SDDS). The computing devices may include instructions that upon execution on or across one or more processors cause the one or more computing devices to obtain, via one or more programmatic interactions, respective indications of one or more of (a) a software development pipeline metadata repository, (b) a software code repository, (c) an authorization database, and/or (d) a deployment environment database (e.g., containing records of respective groups of servers at which the application being developed is installed in different stages of the pipeline as well as in production). Information identifying such data sources (and/or credentials needed to access the data sources) may be provided, for example, via an administrative interface of the SDDS by an SDDS client. The computing devices may identify, based at least in part on contents of the software development pipeline metadata repository, one or more candidate patch target stages of a software development pipeline; such candidate patch target stages may for example include at least one testing stage and a production stage. In at least some embodiments, without requiring command-line input to be provided, the instructions upon execution may cause various types of data to be provided via one or more graphical user interfaces, such as indications of the one or more candidate patch target stages, indications of software modifications or commits that can be included in a patch, indications of various eligible deployment environments corresponding to a particular candidate target stage, and so on. Input received via the graphical user interface(s) may be used to trigger various patch related operations, such as builds and deployments, in at least some embodiments; as such, error prone command line submissions may not be required in such embodiments. A build of a patch which comprises at least some of the software modifications or commits displayed via the GUI may be initiated, for example, based on input obtained via the GUI. Build progress status information, including for example an estimated completion time of the build, may also be provided via the GUI in at least some embodiments.

Prior to initiating deployment of a successfully-built patch to a selected deployment environment associated with a selected target stage of a pipeline, a verification operation pertaining to the state of the selected deployment environment may be performed in at least some embodiments. Such an operation may be used to check that a deployed version of software at the deployment environment has not changed since an earlier software state snapshot of the deployment environment was obtained with respect to the patch, e.g. to verify that the state of the deployment environment has not changed in such a way that the patch is no longer applicable to the deployment environment. If the verification succeeds, the patch may be deployed to the deployment environment.

In some embodiments, the SDDS may be implemented using resources of a provider network or cloud computing environment. One or more of the data sources accessed for patch related tasks may be located at premises external to the provider network's data centers in some embodiments. For example, a client of the SDDS may maintain a software repository and/or a pipeline metadata repository at the client's data center. In some embodiments, at least one of the target deployment environments for a patch may comprise resources of a provider network—e.g., a set of compute instances of a virtualized computing service implemented at the provider network may be used to host an application for which a patch is introduced using the SDDS. In other embodiments, at least one target deployment environment may comprise resources located outside the provider network's data centers, such as a set of servers located at a client's premises.

According to at least some embodiments, various elements of a GUI may be dynamically generated by the SDDS based on the information that has been provided by a user via other elements of the GUI, information in an authorization database, records of recent coding activity of the user, pipeline ownership data (indicating the set of software pipelines owned by a team to which the user belongs), and/or defect queue data (indicating the set of defects that are in the user's queue of to-be-completed tasks). For example, the set of valid candidate options made available to a user in one text entry element may depend on data entered in another text element, or the set of elements presented in a given portion of the GUI may themselves differ. The PAT backend components may submit queries to the relevant data sources or repositories at various phases of the patch management process, and identify valid options to be presented to the GUI user based on the results of the queries in at least some embodiments. Before causing a GUI element (e.g., a clickable button or a checkbox) usable to submit a patch related command (e.g., command to build or deploy a patch, or to add code to a package associated with a patch) to be presented to a user of a graphical user interface, the PAT backend may determine, using an authorization database, whether the user has permission to execute the patch related command in various embodiments. In some embodiments, a message or notification indicating whether the user has permission may be presented to the user via the GUI, e.g., in advance of a submission of the command. In at least one embodiment, if the user does not have permission for a command, the interface element to submit that command may not even be presented in the GUI, thus preventing the user from attempting to submit an unauthorized command which would fail due to a lack of permission. Depending on the permissions granted to respective users, the GUI may include different combinations of interface elements for the users in at least some embodiments—e.g., one user may be presented GUI elements E1, E2 and E3 at a particular phase of the patch workflow, while another user may only be presented with GUI elements E1 and E2. As such, the set of presented interface elements that can be used to submit commands and/or to view patch related information may differ from one user to another. In some embodiments, a PAT may automatically submit/transmit a request to a permissions owner (e.g., an administrator of the application or an administrator of a build tool), indicating that a PAT user does not have permission to initiate a patch related operation, such as a build or a deployment operation. In such a scenario, the PAT may receive an indication in response from the permissions owner that the permission has been granted (or that the permission is denied), and dynamically modify the information and command options presented to the user accordingly.

According to at least some embodiments, the PAT may utilize one or more analytics or machine learning tools to provide recommendations, warnings, metrics and the like during various phases of the patch workflows. In one embodiment, for example, such tools may be used to provide indications of a recommended target stage of a pipeline at which a particular patch should be inserted or deployed, and/or one or more recommended deployment environments for a particular patch. A pipeline stage may be identified as a recommended stage for a patch based on various factors such as (a) a deployment schedule of an application for which the patch is generated (e.g., how soon the application is to be deployed to a production environment), (b) an impact analysis of a defect to be remediated by the patch, (c) a testing requirement estimate associated with the patch, (d) a size metric of the patch (e.g., how many different source code files are modified in the patch) and/or (e) a pipeline stage in which a defect to be remediated by the patch was detected.

In one embodiment, the PAT may utilize an algorithm to determine an applicability estimate of a software code change or commit to a given defect (e.g., based on analysis of a description of a defect, the names of the functions/methods/data structures in the source code file in which the change is made, and/or records of earlier defects and code changes). Such an applicability estimate may, for example, indicate whether a change to file F1 has a low, medium or high probability of being applicable to a defect D. Such applicability estimates may be provided to PAT GUI users submitting a request to include a particular code change in a patch for a given defect, e.g., as advisory information that may be useful in preventing unnecessary or unneeded code changes from being included in a patch. For example, if the PAT indicated that there is only a 10% probability that a code change C1 is likely to be useful for the defect, the engineer that selected C1 for the patch may in some cases take a more detailed look at the code change C1 before submitting the request to include C1 in the patch. In contrast, if the PAT indicated that there is a 95% probability that a code change C2 is likely to be useful for the defect, the engineer that selected C2 may not need to take a closer look at C2.

To further streamline the patch workflow and reduce human errors therein, the PAT may in some embodiments employ searches (i.e., such as prefix searches, wild-card based searches and/or other searches which are not exact match searches in that the only a portion of a search term is indicated by the PAT user) to populate or narrow down the options for at least some entry elements of the GUI. For example, as soon as a user types in "Ron" in a GUI entry field used to indicate the name or identifier of an individual responsible for signing off or approving an operation, the PAT may search the authorization database and provide a short list of users whose names or identifiers being with the letters "Ron". In some embodiments, in response to an analysis of input provided via the GUI, the PAT may update one or more entries in a defect tracking database, or populate one or more entry elements with data retrieved from the defect tracking database. In at least one embodiment, the GUI may enable one user to submit queries pertaining to patches being processed on behalf of other users, and obtain status information pertaining to such other patches. In various embodiments, an SDDS may collect and store various patch related metrics, such as the number of patches introduced at various stages of a software development and deployment pipeline, the time it took to generate/build/deploy the patches, patch sizes, the statistical breakdown of patches by source code sub-trees or by engineering or support teams, and the like. In response to programmatic metrics requests, such metrics may be presented to authorized users via programmatic interfaces in such embodiments.

Example System Environment

FIG. 1 illustrates an example system environment in which a patch automation tool may be implemented at a software development and deployment service, according to at least some embodiments. As shown, system 100 comprises resources and artifacts of a software development and deployment service (SDDS) 110 which may be used by various clients or users to help develop, test, and deploy applications to a set of target deployment environments 150, such as environments 150A and 150B. Such target environments may, for example, include resources for various production and pre-production versions of web-sites WS1, WS2 and the like.

A number of data sources may be accessed from or implemented within the SDDS 110 in the depicted embodiment to accomplish software development, testing and deployment tasks on behalf of SDS clients 152. Such data sources may include, for example, software pipeline and stage metadata repositories 112, at which information about registered/approved pipelines for testing and deploying full-fledged versions of applications (i.e., versions whose entire code base has been analyzed using a sequence of tests at respective stages) may be stored. Other examples of the data sources may include a deployment environment database 114, one or more code repositories 116, a build database 119 associated with one or more build tools 118, and/or an authorization management database 120 in some embodiments. Deployment environment database 114 may contain descriptors, ownership information and other properties of various target deployment environments (e.g., sets of servers) which have been set up for the applications being managed using the SDDS in the depicted embodiment. Note that in at least some embodiments, multiple deployment environments may be configured for individual stages of a pipeline (including various testing stages as well as production stages). Code repositories 116 may contain source code of the applications, build database 119 may contain representations and records of successful (and in some cases unsuccessful) software builds (including patch builds as well as full-fledged application builds), and authorization management database 120 may contain entries indicating the permissions, roles, capabilities etc., granted to various users of the SDDS 110. A build, generated using build tools 118, may represent a deployable representation of at least a portion of a software application in various embodiments, comprising a set of artifacts (executable code, configuration settings and the like) that can be installed and run at one or more computing devices of a deployment environment. In some embodiments, the SDDS may also provide support for a number of other software development tools 132, such as IDEs (integrated development environments), compilers, and the like.

In at least some embodiments, the SDDS 110 may include a number of client-accessible tools, such as a pipeline management tool (PMT) 126, a patch automation tool (PAT) 128, and/or a defect tracking database 131. The PMT 126 may be used primarily to set up and manage the execution of long-running software pipelines, intended to generate application releases by (among other steps) accumulating all the code to be included in the releases and passing the accumulated code through a sequence of pipeline stages and approval steps selected for the respective applications. The PAT 128 may be used primarily for managing patch workflows, each concerned with (in most cases) changes to a small subset of the application's overall code base, which are intended to remediate an identified defect (or a few related defects) quickly. The defect tracking database 131 may store records pertaining to defect detection/reporting and the steps taken to remediate the defects in at least some embodiments. Both the PMT 126 and the PAT 128 may be provided indications of, and granted access to, various one of the data sources 112, 114, 116, 119 and 120 as well as the build tools 118 in the depicted embodiment, e.g., via programmatic interfaces. In some embodiments, the PMT and/or the PAT may be used to manage software for which pipeline metadata, deployment environment information, code, builds and/or authorization management information are stored outside the SDDS 110 (e.g., at other services, at client data centers or the like).

A number of different kinds of programmatic interfaces may be implemented to enable clients 152 to utilize the SDDS 110 for their applications in the depicted embodiment. Such interfaces may, for example, include web-based graphical user interfaces or consoles, standalone graphical user interfaces which do not necessarily use HTTP (HyperText Transfer Protocol) or its variants, command line tools, application programming interfaces (APIs) and the like in different embodiments. In FIG. 1, three types of programmatic interfaces are indicated by way of example: PMT programmatic interfaces 176, PAT administrative programmatic interfaces 177, and PAT graphical user interface 178 for end users. The PMT interfaces 176 may be used to submit client requests pertaining to pipelines and their stages—e.g., to create/configure a pipeline, to define stages of the pipeline, to activate/deactivate pipelines and so on. PAT administrative programmatic interfaces 177 may be employed by clients (e.g., application administrators) to provide information such as the set of end users (such as software engineers or support engineers responsible for resolving defects) allowed to request patch workflows, the users that are permitted to sign off on patches, to provide information about the specific subset of software code that can be included in patches for a given application version, to provide information and credentials pertaining to data sources such as pipeline and stage metadata repositories, deployment environment databases, and so on. In scenarios in which the PAT 128 is to access data sources outside the SDDS itself, e.g., external code repositories or external pipeline metadata, information (e.g., network addresses, credentials etc.) to be used to access the external data may also be provided via administrative interfaces 177. PAT graphical user interfaces 178 may be used to submit patch workflow-related commands or requests, e.g., to select a target stage and deployment environment for a given patch, to select the specific code changes that are to be included in a patch, to request a patch build, and perform other patch related operations in the depicted embodiment. Note that in some embodiments, the administrative interfaces 177 may be combined with end-user graphical user interfaces 178, e.g., as part of a single unified graphical user interface. In at least one embodiment, users who are allowed to utilize the PAT interfaces 178 or 177 may not necessarily be permitted to use the PMT interfaces 176; that is, direct access to pipeline management tools may not necessarily be provided to some users that are allowed to participate in patch-related operations. In such embodiments, if needed, pipeline related operations may be performed by the PAT on behalf of such users.

In various embodiments, one or more PAT GUI interfaces 178 may help streamline patch workflows for end users, e.g., to ensure that (a) the end users are requested for only the information that is required for a patch to be tested and deployed, and not for any extraneous information and (b) the probability of introducing errors in the patch workflows (e.g., by submitting the wrong commit, or requesting a patch be introduced into the wrong stage or wrong deployment environment) is minimized. Note that in many cases, patches may be required to be deployed in high pressure scenarios for the engineers and support personnel involved—e.g., because an important and high-visibility web site is not functioning properly, or a new feature of an application is not behaving as expected. A number of PAT backend and GUI interface elements 154 may be designed to reduce human error during patch workflows in the depicted embodiment—e.g., drop-down menus may be populated with only valid options for an entry (thus avoiding the selection of options that might result in errors), searches based on partial/incomplete search terms may be used to populate text fields of the GUI so as to avoid spelling errors, permissions of the end users may be checked even before the commands that require the permissions can be issued via the GUI, and so on.

A client 152 may initiate a workflow with respect to a given patch by providing various properties of the patch via the GUI 178 in various embodiments. During the course of the workflow, a relevant subset of data retrieved from one or more of the data sources for the various phases of the workflow may be displayed via the GUI 178 in the depicted embodiment, including for example representations of various candidate target stages for the patch, software modifications or commits which may be included in the patch if picked by the user, and so on. A build of the patch may be initiated, e.g., using build tools 118, in response to input received via the GUI 178 in various embodiments. If the build is successful, it may be deployed to the resources of one or more target deployment environments 150, such as 150A or 150B, in response to further input received via the GUI in some embodiments.

In some cases, it may take at least a few minutes between the time that a client requests a patch build, and the time that the build succeeds. In at least some embodiments, to ensure that a patch is not deployed to an environment that has changed during the time since the patch workflow began or the time since the patch build was requested, a snapshot representing a record of the software state of the target deployment environment may be obtained at a PAT 128, e.g., just prior to the request of the build. Such a snapshot may indicate the currently-deployed software version set in use at the target deployment environment prior to the build. The pre-build snapshot may be used by the PAT, before deploying the patch produced by a successful build, to verify that the deployed software version set has not changed in the interim in at least some embodiments—e.g., a new snapshot of the environment's software state may be created and compared with the pre-build snapshot.

In many software organizations, a defect tracking tool or database 131 may be used to indicate when (e.g., in which pipeline stage, and in which deployment environment) a defect was detected, the assignment of the defect resolution responsibilities, the current status of the defect resolution process, and so on. In at least some embodiments, the PAT 128 may automatically modify, create or access entries in such a defect tracking tool or database.

In some embodiments, in addition to the core responsibilities of providing an easy to use interface which can be used by engineers or support staff associated with an application to perform various patch related operations, a PAT 128 may also orchestrate or access results of a number of defect and patch-related analytics tools, such as a set of machine learning resources 124. Such resources (which may include, for example, machine learning models trained using records of past defects, lexical analysis tools that can correlate defect descriptions with source code method/function names, and the like) may be employed in some embodiments by the PAT 128 to generate recommendations for various selection operations that may be required from clients during a patch workflow, to provide estimates and metrics associated with various phases of the workflow (e.g., a probability that a code change is likely to be relevant to a defect), and so on.

Example Pipeline

Figure 2:
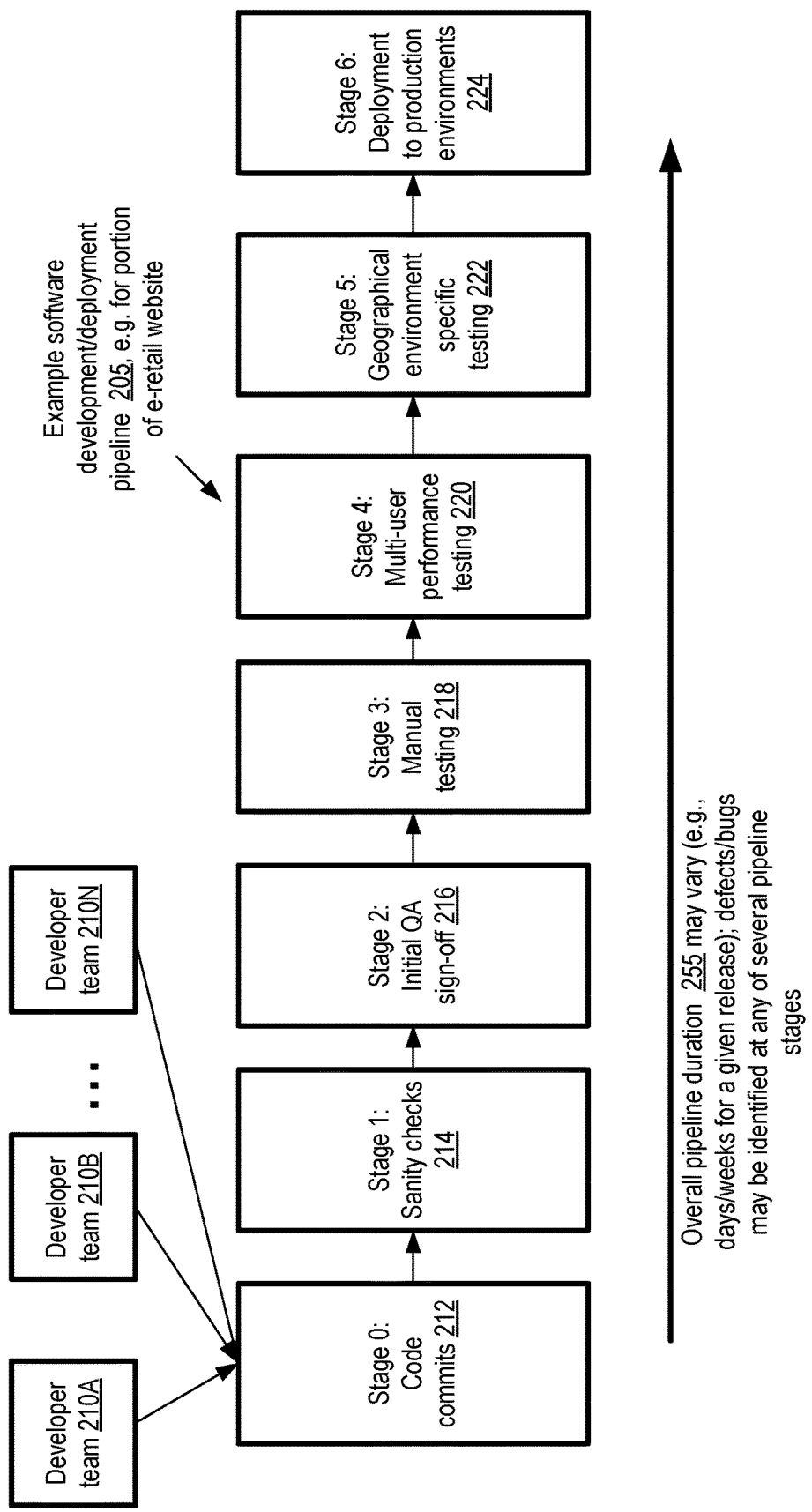
FIG. 2 illustrates an example software development and deployment pipeline for which a patch automation tool may be employed, according to at least some embodiments.

FIG. 2 illustrates an example software development and deployment pipeline for which a patch automation tool may be employed, according to at least some embodiments. In the depicted embodiment, example pipeline 205 may comprise seven stages labeled Stage 0 through Stage 6, and may be used to manage the deployment of at least a portion of an e-retail website. Numerous software developer teams 210, such as 210A-210N, may contributes software at the initial stage of the pipeline, labeled code commits 212 in the depicted embodiment. A given code commit may comprise modifications to one or more files containing source code, configuration information and the like. The term "software modification" may be used in some embodiments to refer broadly to the types of changes (including changes to existing source code files, creations of new source code files, deletions of source code, changes to existing configuration files, introduction of new configuration files, deletions of configuration information, and so on) that may be aggregated or combined to produce a new version of an application.

In Stage 1 of example pipeline 205, a set of sanity checks 214 may be performed on the software in the depicted embodiment, comprising relatively simple tests that verify that the code appears reasonable. In Stage 2, a quality assurance (QA) team member may be responsible for an initial QA sign off or approval 216 of the code, e.g., based at least partly on an analysis of the sanity check results. In Stage 3, a round of manual testing 218 218 may be conducted, in which for example testers assume the role of website visitors attempting various types of transactions or browse paths supported at the web site, and navigate the web site accordingly. In Stage 4, multi-user performance testing 220 may be conducted on the web site, e.g., to ascertain the responsiveness of the web site to high workload levels. In the depicted embodiment, the e-retail web site may be designed for access by end customers from multiple countries or other geographical units, and a round of geographical environment specific testing 222 may be conducted in Stage 5 of pipeline 205—e.g., to check whether the same functionality and performance is achieved in a given geographical environment G1 as in a different geographical environment G2. Finally, in Stage 6, assuming all the tests and signoffs in earlier stages complete successfully, the software may be deployed to one or more production environments in the depicted example scenario. Note that at least in some embodiments, multiple deployment environments may be used for at least some stages of the pipeline—e.g., manual testing (corresponding to stage 3) may be performed in parallel using several different groups of servers, multi-user performance testing (stage 4) may be performed in parallel using other groups of servers, and so on.

The overall pipeline duration 255 may vary, e.g., based on the set of enhancements, new features and defect fixes that are included in a given release of the software. In some iterations of the pipeline, a new version may pass from Stage 0 to Stage 6 within a few days or even a few hours, for example, while in other iterations traversing the entire pipeline may take weeks. Note that at least in some implementations, operations of several different pipeline stages may be performed concurrently or near-concurrently (e.g., for different releases of the application, or even for the same release). Defects/bugs may be identified in several of the stages in the depicted embodiment, and also after the software has been deployed in production. Depending on the scope or impact of a given defect or a set of related defects, a patch automation tool similar to PAT 128 may be employed in at least some embodiments to resolve identified defects by injecting or introducing the patches at one of the stages of the pipeline. A number of factors may be considered when deciding the particular pipeline stage at which a patch is to be inserted in some embodiments, such as the severity/scope of the defect being remedied, the time remaining (if any) before the current version of the software is scheduled for deployment to production, and so on.

Example Approaches To Defect Resolution

Figure 3:
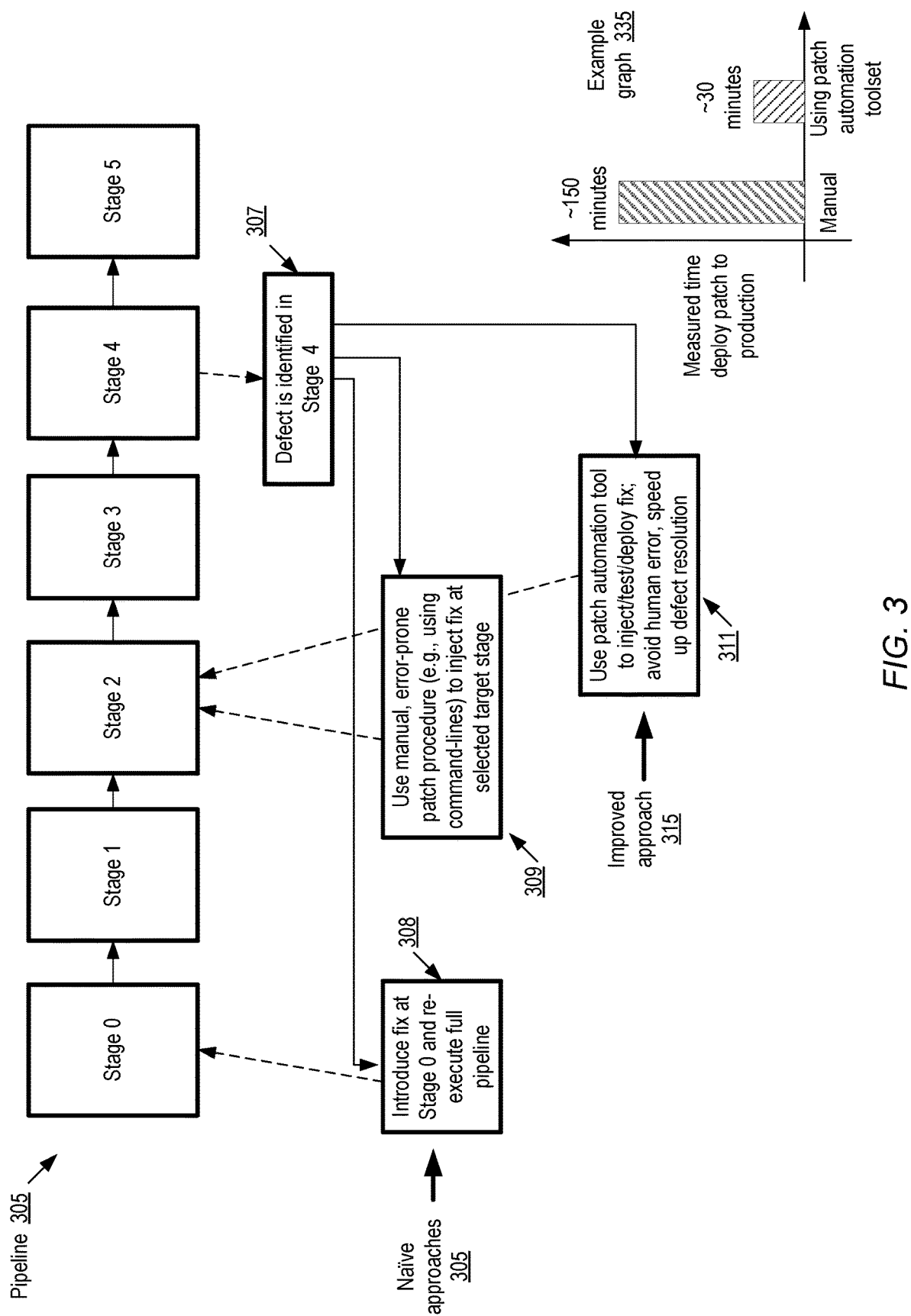
FIG. 3 illustrates example approaches towards software defect resolution with respect to the stages of a pipeline, according to at least some embodiments.

FIG. 3 illustrates example approaches towards software defect resolution with respect to the stages of a pipeline, according to at least some embodiments. In the depicted example scenario, a pipeline 305 of six stages, Stages 0 through 5, may be used for the testing and deployment of an application, and a defect may be identified at Stage 4 as indicated in block 307. In one example of a naïve approach 305 towards resolution of the defect, source code fixing the defect may be identified, and introduced at Stage 0 as indicated in block 308, thus requiring at least the new/modified code to pass through all the stages of the pipeline. Such an approach may not be practical in at least some cases, especially if it would take so long for the entire pipeline to be re-executed that a deadline for deployment to production may be missed as a result. In a second naive approach 309, a manual, potentially error-prone patch procedure may be used to inject the code that resolves the defect at a selected later target stage (e.g., Stage 2 in the depicted example). In this approach, various phases of the procedure may require entry of commands via command line interfaces (CLIs), with some commands requiring numerous command parameters with lengthy and easy-to-misspell names and values. As a result, error may often be introduced at various phases of the procedure, and even in scenarios where no errors are introduced, it may take a while for software developers or support engineers to issue the commands needed to complete the patch testing and deployment.

In an improved approach 315, instead of employing the manual approach 309, a patch automation tool similar in functionality to PAT 128 of FIG. 1 may be used to inject, test and deploy a patch comprising the remediation software, as indicated in block 311. In experiments conducted using one implementation, as shown in example graph 335, the time taken to deploy a patch to production (starting by inserting the patch at the same stage in both cases) was reduced from approximately 150 minutes using the manual approach 309 to approximately 30 minutes using a patch automation tool. Note that the relative speedup achieved for completing the patch workflow may differ from that shown in the example graph 335 in some embodiments; the illustrated approximate example times are not intended to be limiting, and may not apply to at least some types of patches and pipelines.

Example Provider Network Environment

Figure 4:
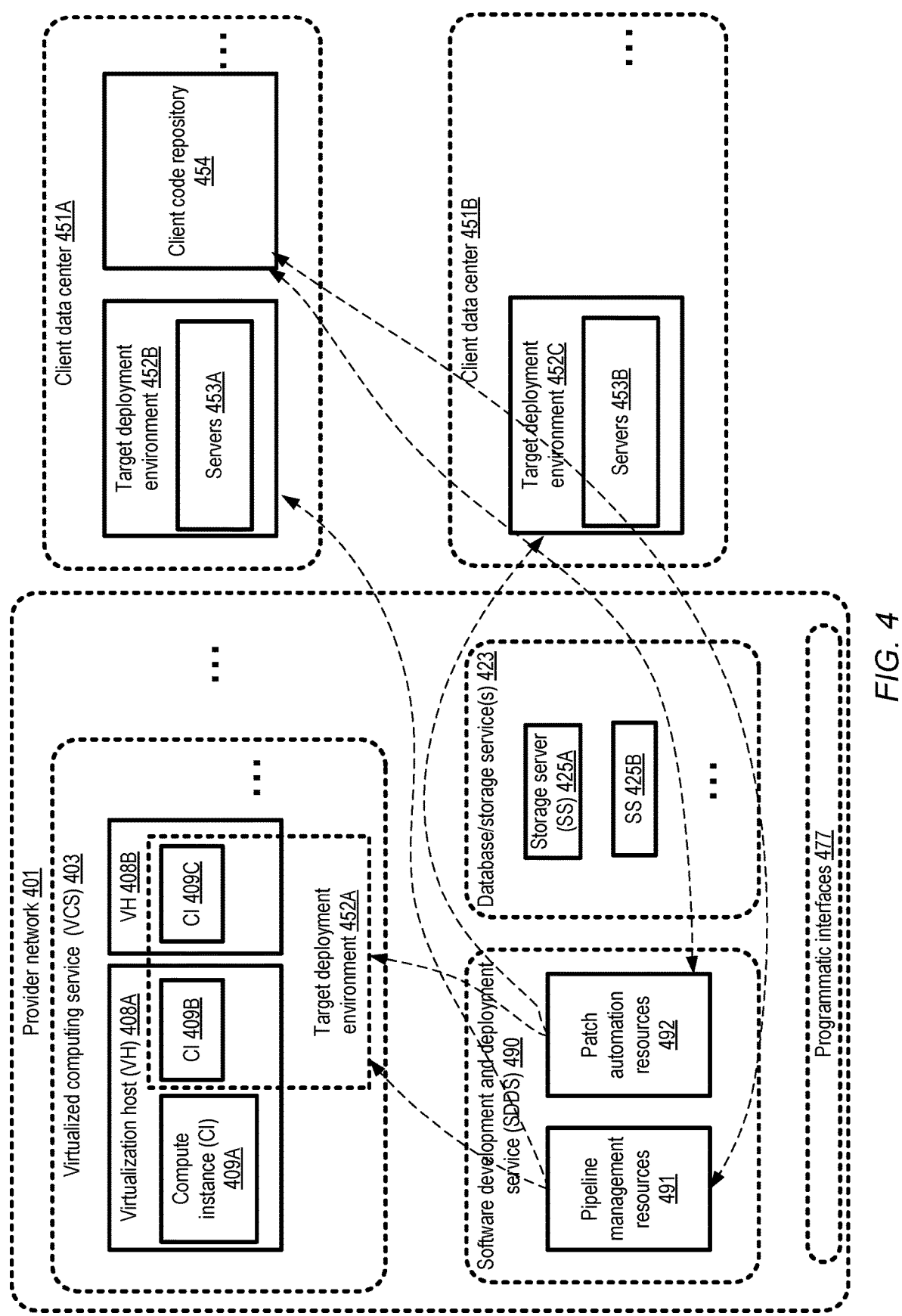
FIG. 4 illustrates an example provider network environment in which a software development and deployment service may be implemented, according to at least some embodiments.

FIG. 4 illustrates an example provider network environment in which a software development and deployment service may be implemented, according to at least some embodiments. Networks set up by an entity such as a company or a public sector organization to provide one or more network-accessible services (such as various types of cloud-based computing, storage or analytics services) accessible via the Internet and/or other networks to a distributed set of clients may be termed provider networks in one or more embodiments. A provider network may sometimes be referred to as a "public cloud" environment. The resources of a provider network, or even a given service of a provider network, may in some cases be distributed across multiple data centers, which in turn may be distributed among numerous geographical regions (e.g., with each region corresponding to one or more cities, states or countries).

In the depicted embodiment, provider network 401 may comprise resources used to implement a plurality of services, including for example a virtualized computing service (VCS) 403 and one or more database/storage service(s) 423, as well as a software development and deployment service (SDDS) 490 similar in features and functionality to SDDS 110 of FIG. 1. Each of the services may include a respective set of computing devices and/or other resources in some embodiments. Components of a given service may utilize components of other services in the depicted embodiment—e.g., compute instances (CIs) 409A, 409B or 409C, implemented at virtualization hosts 408A and 408B of the virtualized computing service 403 and/or storage servers 425 (e.g., 425A and 425B) of the storage service may be employed by various other services of provider network 401. Individual ones of the services shown in FIG. 4 may implement a respective set of programmatic interfaces 477 which can be used by external and/or internal clients (where the internal clients may comprise components of other services) in the depicted embodiment.

The SDDS 490 may comprise a set of patch automation resources 492 (e.g., including resources that implement a patch automation tool similar to PAT 128 of FIG. 1) and pipeline management resources 491 (e.g., including resources that implement a pipeline management tool similar to PMT 126 of FIG. 1) in the depicted embodiment. In some embodiments, the data sources accessed to implement patch workflows, such as a pipeline and stage metadata repository, a deployment environment database, a code repository, a build database and the like may be stored at the database or storage services 423. In the depicted embodiment, some data sources used by the SDDS may be located outside the provider network—e.g. a code repository 454 of an SDDS client may be stored at the client's data center 451A. Target deployment environments for some pipelines for which patch workflows may be automated using the SDDS 490 may include resources within the provider network in some embodiments—e.g., target deployment environment 452A may comprise compute instances 409B and 409C. Other target deployment environments for patches managed using the SDDS may comprise resources outside the provider network—e.g., target deployment environment 452B may comprise a set of servers 453A located at client data center 451A, while target deployment environment 452C may comprise another set of servers 453B located at client data center 451B. As such, the SDDS 490 of provider network 401 may be used to automate the process of generating and deploying patches within the provider network, as well as at premises outside the provider network, using data sources that may also be located within the provider network or at premises outside the provider network.

In at least one embodiment, at least some of the techniques discussed above for patch automation and software pipeline management may be accomplished without utilizing resources of network-accessible services such as those shown in FIG. 4. For example, a standalone set computing devices which are not part of a network-accessible service may be used in some embodiments.

Example User Interfaces

Figure 5:
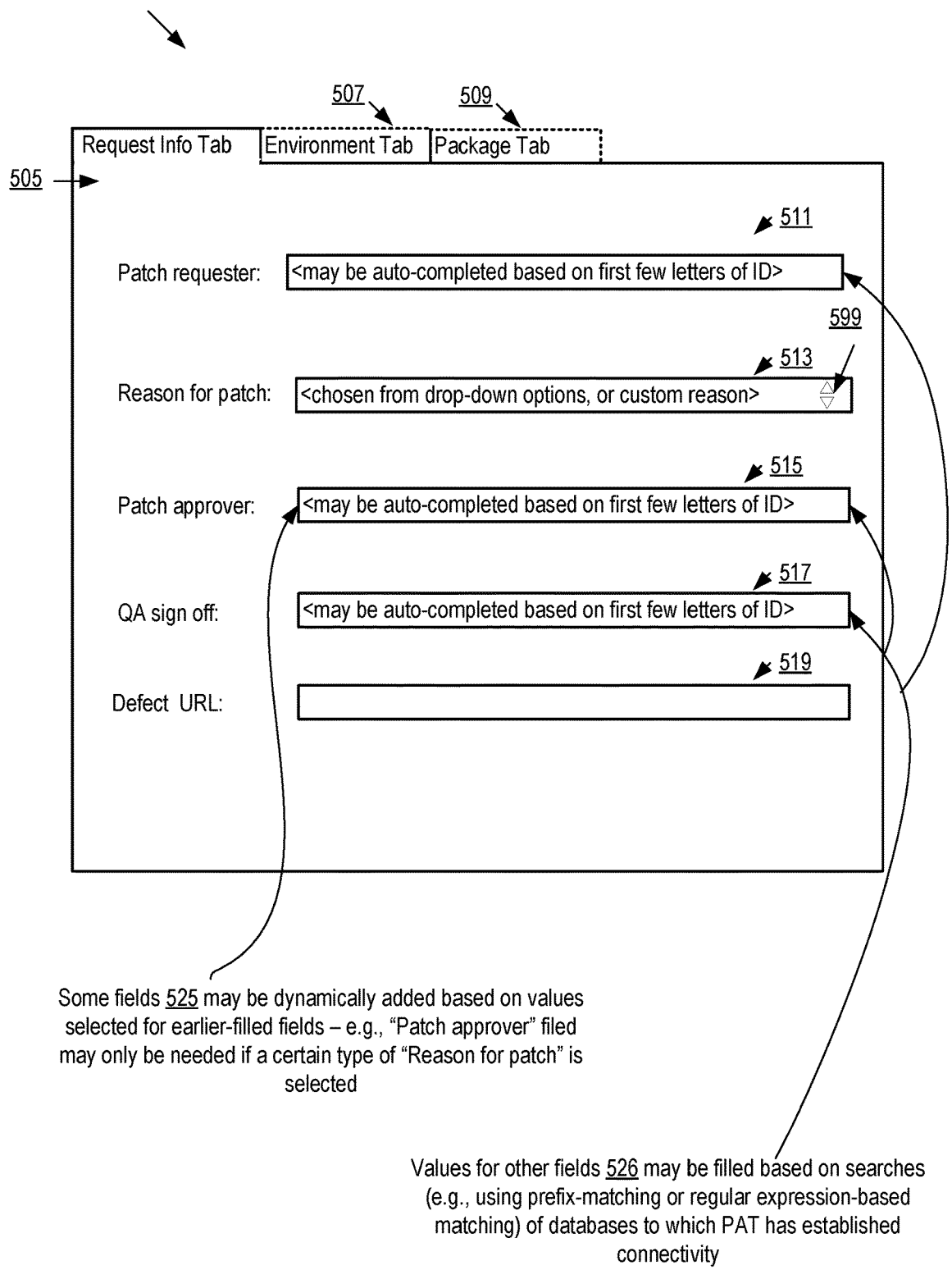
FIG. 5, FIG. 6 and FIG. 7 collectively illustrate patch request related aspects of an example user interface that may be implemented by a patch automation tool, according to at least some embodiments.
Figure 6:
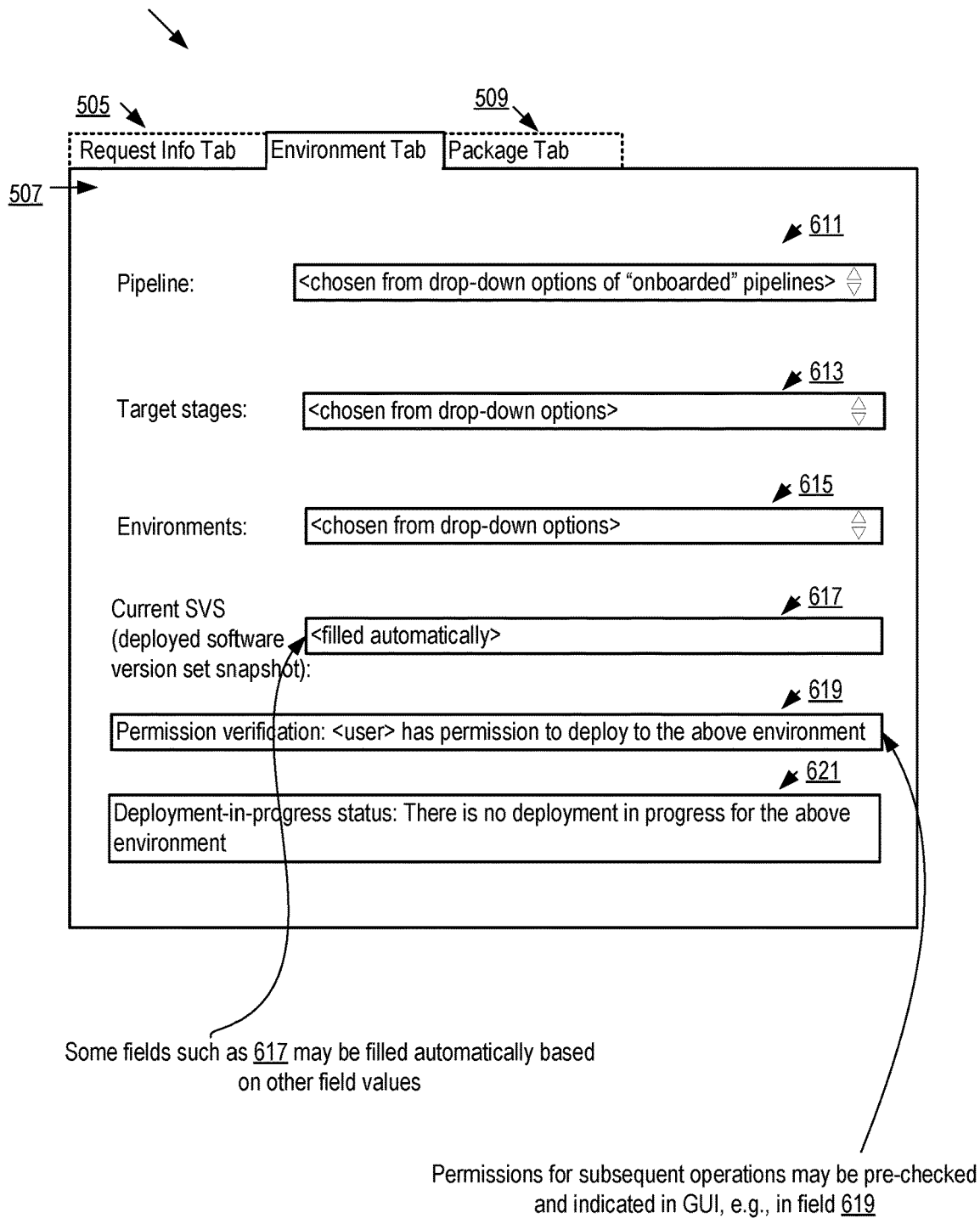
Figure 7:
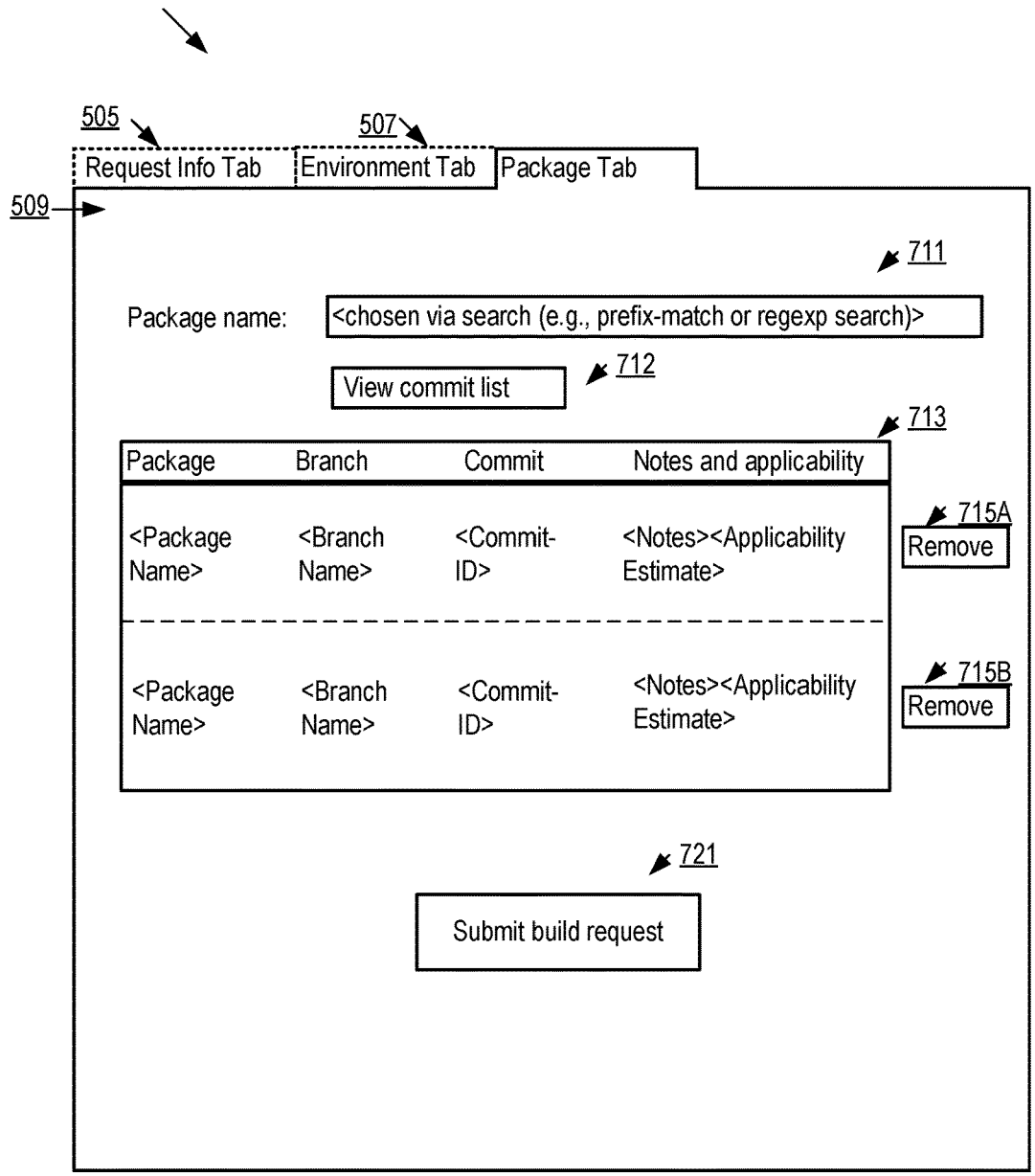

As mentioned earlier, a software development and deployment service may provide a number of easy-to-use interfaces to help guide users through various patch related tasks. At least some such interfaces may comprise a sequence of web pages (accessed using HTTP or HTTPs, for example), or an equivalent sequence of tabs of a standalone graphical user interface that does not necessarily require HTTP/HTTPs. The process of building and deploying a patch may be begun by specifying various parameters of a patch request, including for example a pipeline and target stage in some embodiments. FIG. 5, FIG. 6 and FIG. 7 collectively illustrate patch request related aspects of an example user interface that may be implemented by a patch automation tool, according to at least some embodiments.

Multi-tab patch automation tool (PAT) GUI 502 may comprise at least three tabs in the embodiment depicted in FIG. 5—a request information tab 505 designed to obtain general information about the request (such as the identity of the patch requester), an environment tab 507 for obtaining details about the pipeline stage and target environment, and a package tab 509 in which details regarding the specific software commits to be included in the patch may be obtained. In FIG. 5, example elements of the request information tab 505 are shown. These elements may include a patch requester field 511, a patch reason field 513, a patch approver field 515, a QA (quality assurance) sign off field 517, and a defect URL (Uniform Resource Locator) field 519.

The PAT may utilize data sources, such as an authorization database containing user names of the SDDS clients, to help fill out various elements of request information tab 505 in the depicted embodiment. For example, as soon as a user enters the first few characters of a user identifier (or name) stored in the authorization database within a form field such as requester field 511, approver field 515, or QA sign off field 517, as indicated by arrows 526, a prefix-match search (or other searches that are not exact match searches) may be conducted at the authorization database, a pre-populated list of one or more user identifiers/names may be shown as an options list. The user may then select from one of the provided options to fill out the field. Some fields may be automatically filled out without requiring any user input in at least some embodiments—e.g., based on the identity of the user requesting the patch, the PAT may look up a QA manager associated with the requester, and fill out the QA sign off field 517 without requiring further input. In addition to prefix matching based searches, in some embodiments regular expression based searches (e.g., in which the "*" symbol may be used as a wild card) and/or error-correction based searches (e.g., in which, if a user enters "Jhon" instead of "John", the PAT corrects the error and conducts a search based on the corrected version) may be used to fill out at least some fields. In addition, some fields 525 may be dynamically added to the interface, or removed from the interface, based on values entered in other fields. For example, a "patch approver" field 515 may only be displayed if one of a specific set of reasons is entered in the "reason for patch" field 513; for patches of other types, a specific patch approver may not be required. Values of some fields may be selected from pre-populated lists (e.g., as indicated by the "select-from-list" symbol 599) in various embodiments, with the list options being displayed using a drop-down menu or the like. In the defect URL field 519, the patch requester may indicate a URL that can be used to access a defect report (indicating the defect(s) being remediated via the patch) entered into a defect tracking tool in some embodiments. The URL may be used by the PAT in one embodiment to automatically modify/update the defect report entry as the patch workflow proceeds—e.g., information entered via the GUI 502 may be copied into the defect report, the times at which a patch build or deployment was requested and/or completed may be added to the defect report, and so on. In some embodiments, in addition to or instead of using authorization data, the PAT may use information from one or more of several additional sources to determine the elements to be included in a user interface, to populate options from which a user may select, or to fill out one or more fields. Such information may include, for example, coding activity data (indicating recent code changes made by a user, or code recently viewed by the user), pipeline ownership data (indicating the specific pipelines owned by a team or organizational unit to which the user belongs), and/or defect queue data (indicating the set of defects that have been assigned to the user for fixing/remediation).

FIG. 6 shows example elements of the environment tab 507 of the PAT GUI 502. In the environment tab, the user may use field 611 to indicate a pipeline for which the patch is to be built, e.g., by selecting from a pre-populated list of pipelines to which the user has access. In the depicted embodiment, a number of different deployment environments (sets of computing devices to which the software being managed using the pipeline may be deployed for testing, or deployed after testing is completed) may be associated with individual stages of a pipeline. The user may select one or more target stage(s) into which the patch is to be injected or inserted using field 613, and one or more target deployment environments may be selected via field 615. Valid options for field 613 may be identified by the PAT based on the specified pipeline (e.g., using queries directed to a pipeline and stage metadata repository to which the PAT has established connectivity), while valid options for field 615 may be identified by the PAT based on the combination of pipeline and target stage information (e.g., using queries directed to a deployment environment database to which the PAT has established connectivity). Because the PAT is able to query such data sources, the patch requester is in effect prevented from providing invalid values for fields such as 613 and 615, thereby reducing the probability of deploying the patch to an inappropriate stage or environment.

After the user has selected values for fields 611, 613 and 615, in the depicted embodiment the PAT may automatically fill out field 617 to indicate the currently-deployed software version set (SVS) at the selected environment(s) and stage(s). The current SVS may represent a snapshot of the software state of a target deployment environment, which can later be used by the PAT to automatically verify that a patch is still applicable (i.e., to verify that the target environment's software state has not changed in such a way that the patch may no longer be valid for the environment).

In the depicted embodiment, the PAT may provide one or more additional notifications pertaining to the information that was entered into fields 611, 613 or 615. For example, the PAT may use the authorization database and/or the other pipeline, stage and deployment environment databases to verify whether the user has permissions to deploy patches to the specified pipeline, stage and environment, and display message 619 indicating the result of the verification. Note that this permission checking operation is performed in the depicted embodiment before the interface elements to request a build or deployment are even displayed to the user, as such, the PAT may anticipate actions/commands or operations that may be requested later in the workflow in some embodiments, and perform permissions checks for such anticipated operations. In some embodiments, if the pre-checking of the permission indicates that the user is not permitted to perform an operation, the PAT may automatically send a request for the permission to a permissions owner (e.g., an administrator or manager identified using the data sources to which the PAT has access), and the permission may be quickly obtained for the user if the permissions owner decides to grant the requested permission. In one such embodiment, a message indicating that the permission has been requested may be displayed via GUI 502. The PAT may perform advance checking of permissions (and provide advance indications of whether the permission is granted or not) for other types of patch related operations as well in some embodiments, such as operations to add or push code to a package to be included in a patch. It may sometimes be the case that while many PAT users have permissions to view source code, only a subset of users are granted rights to add code to a package, and it may therefore be useful to inform a PAT user whether the user is permitted to make such changes or not, before the user attempts to add any code.

In element 621, the PAT may provide an indication as to whether a deployment (e.g., of another patch) is already underway at the selected deployment environment. If such a deployment is underway, the patch requester may decide to wait until the currently-in-progress deployment effort ends before proceeding with a build and deployment of a new patch, as it is likely that the deployed software version set at the target deployment environment will have changed as a result of the current deployment, thus potentially rendering the new patch invalid. Providing information such as that indicated in element 621 may help avoid wasting resources (e.g., resources devoted to building a new patch that may have become un-deployable because the target environment has changed) in at least some embodiments.

FIG. 7 shows example elements of the package tab 507 of the PAT GUI 502. In the depicted embodiment, related source code files of the application for which the patch is to be generated may be organized into groups called packages (e.g., similar to the package constructs of the Java™ programming language), and information about the specific packages that collectively form the application may be stored in the source code repository. A given patch may comprise changes to one or more packages, and a given set of changes to a package may be identified by a branch name (with the word "branch" indicating, for example, that the changes represent a divergence from the mainline source code of the application). In the embodiment depicted in FIG. 7, a user may enter a package name in field 711 of PAT GUI 502, e.g., with the PAT performing a search at the source code repository as soon as a few letters of the package name are entered, and using the results of the search to provide a set of options from which the user can select a package name. As in the case of other GUI fields for which the PAT performs a search, regular expression (regexp) searches may also be supported, and/or auto-correction of search terms may be implemented if a user enters a slightly misspelled entry. With respect to the selected package, interface element 712 may be used to view a commit list which shows (e.g., in another part of the GUI 502, not included in FIG. 7) a set of submitted code modifications of the package in the depicted embodiment.

From the set of code modifications, the user may choose the ones that are to be included in the patch, and the selected commits or modifications may be displayed in region 713 of tab 509. For each commit or modification selected for inclusion in the patch, the following information may be displayed in the depicted embodiment in region 713: the name or identifier of the package to which the commit belongs, the name or identifier of the branch, the identifier of the commit, as well as any commit notes (e.g., comments or annotations explaining the changes made in the commit). In at least some embodiment, the applicability estimate may be obtained by the PAT using machine learning, lexical analysis or other tools to which the commit notes, the description of the defect being addressed (accessed for example from the defect tracking tool using URL 519 of FIG. 5), and the names and/or contents of the modified source code files may be provided as input. If the applicability estimate displayed in the GUI 508 is high for a given commit, this may indicate to the user that the commit is more likely to remediate the defect than if the applicability estimate is low in the depicted embodiment, and this may for example prompt a re-evaluation of whether the low-applicability commit should actually be included in the patch.

Elements 715A and 715B may be used to remove a corresponding commit from the set of code changes to be included in the patch in the depicted embodiment. A build request for the patch, which is to comprise the set of commits shown in region 713, may be submitted via button 721.

Figure 8:
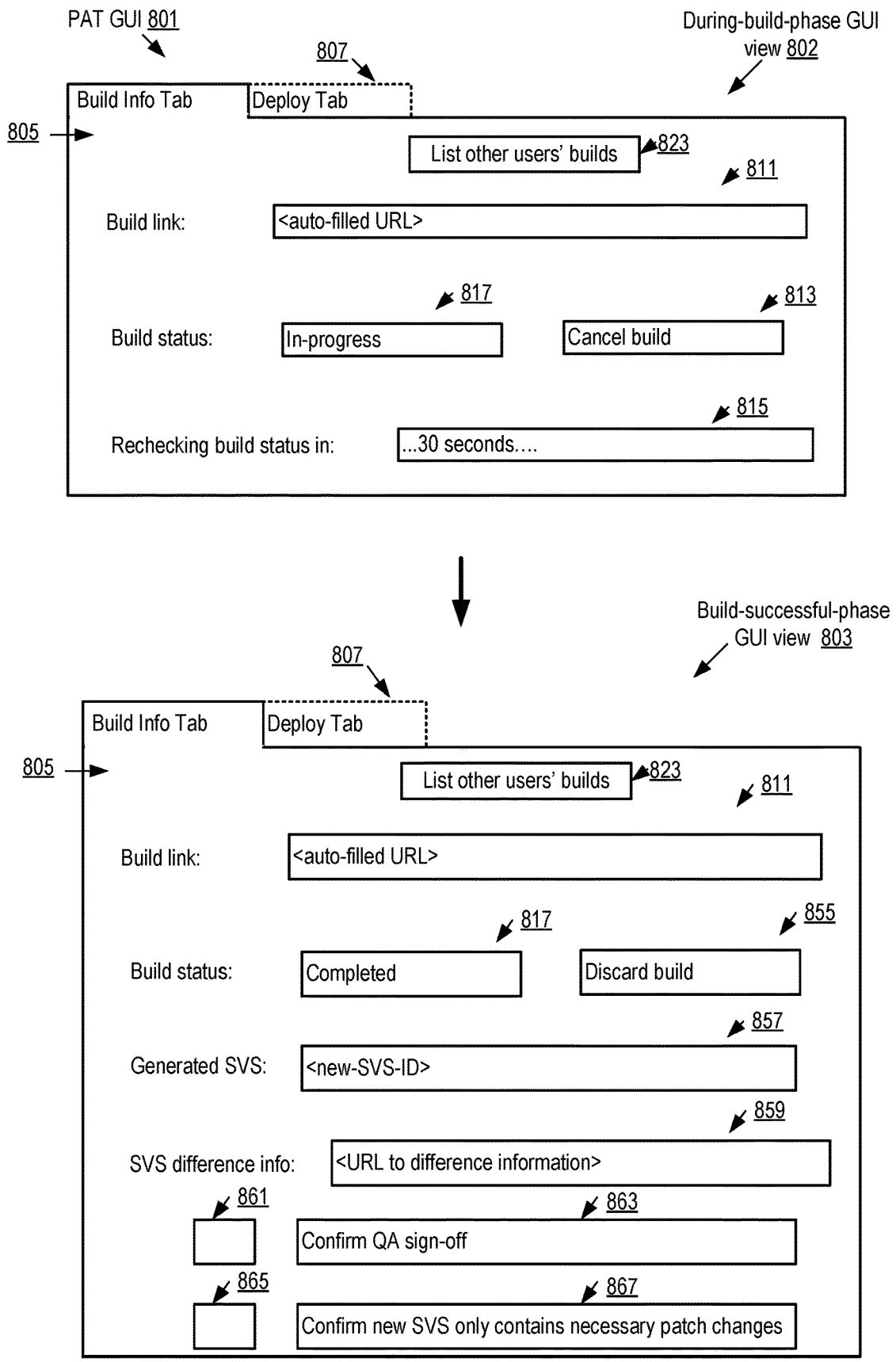
FIG. 8, FIG. 9 and FIG. 10 collectively illustrate patch building and deployment related aspects of an example user interface that may be implemented by a patch automation tool, according to at least some embodiments.
Figure 9:
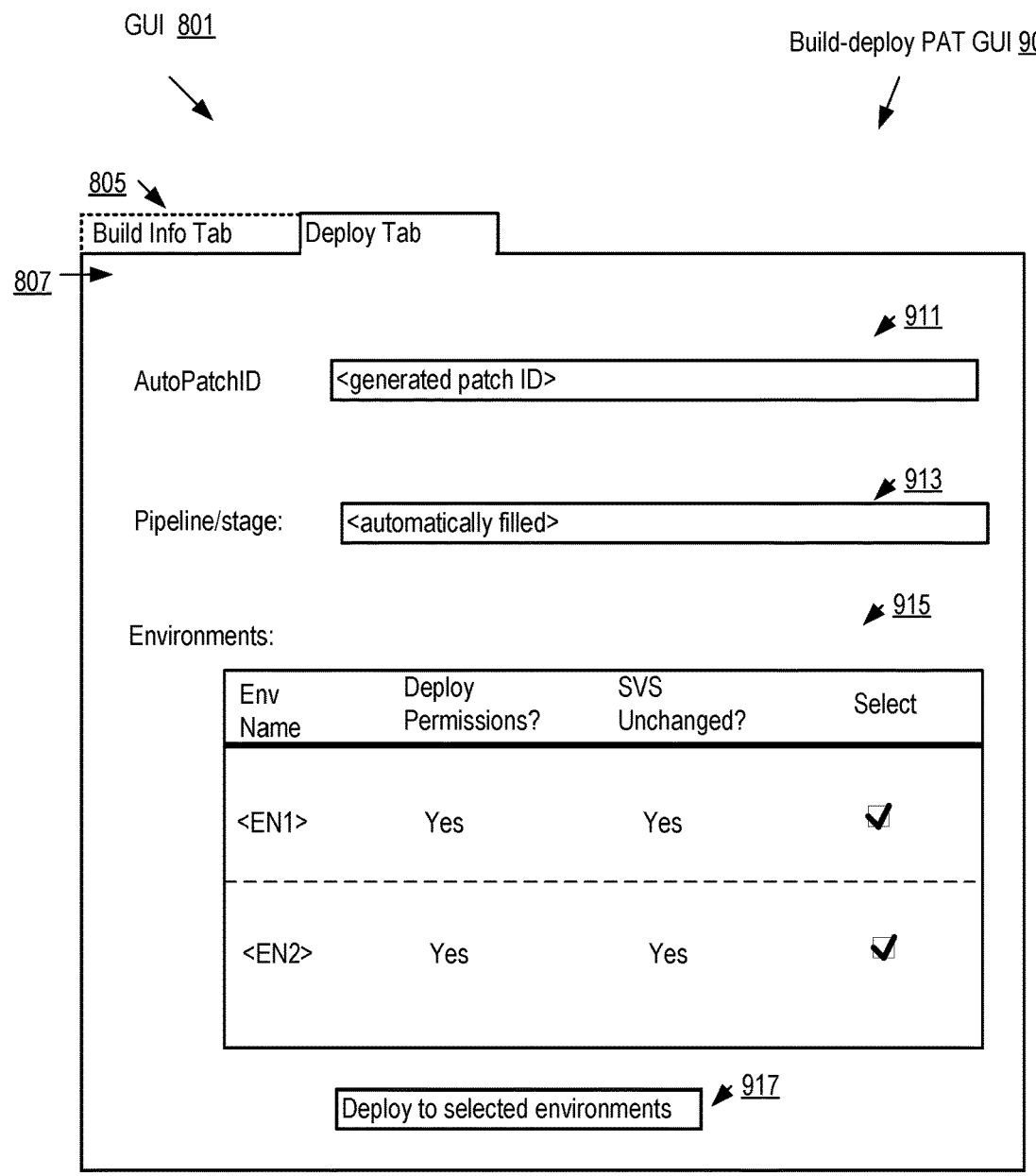
Figure 10:
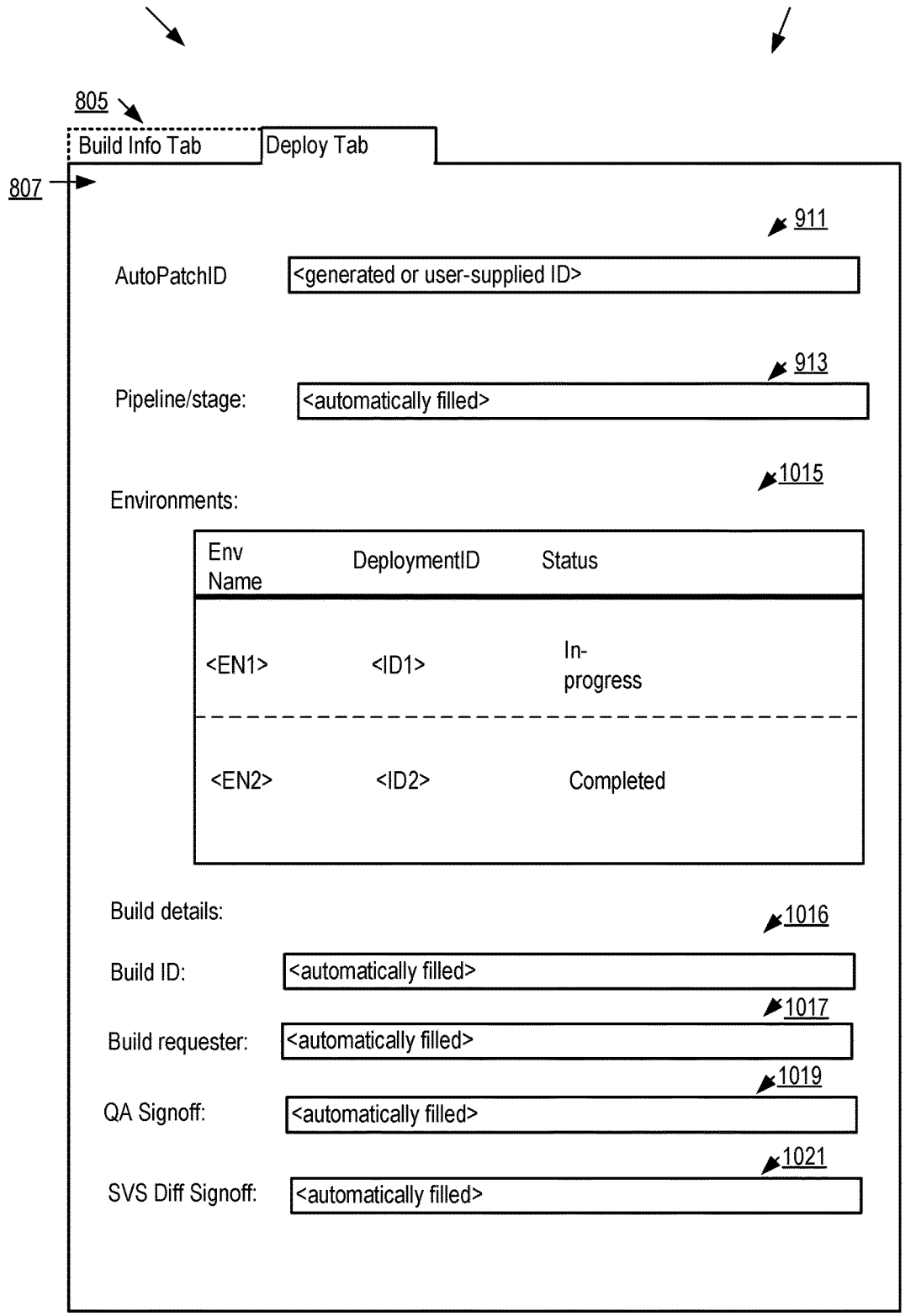

FIG. 8, FIG. 9 and FIG. 10 collectively illustrate patch building and deployment related aspects of an example user interface that may be implemented by a patch automation tool, according to at least some embodiments. In some embodiments, the build information tab 805 and deploy tab 807 of a patch automation tool GUI 801 may be presented as a separate standalone interface (or a separate set of web pages starting with a different URL) from a GUI 502 used to provide information about the build and request the build; in other embodiments, all the interface elements shown in FIG. 8, FIG. 9 and FIG. 10 may be combined via respective tabs of the same web-based or standalone interface. Interface elements that may be presented to a user (e.g., the requester of a patch build) in some embodiments via a build information tab 805 during the time that a patch is being built are shown in view 802 of FIG. 8, and interface elements that may be presented after the patch is successfully built are shown in view 803.

An auto-generated web link to a page that provides additional details regarding the patch build (e.g., a complete list of the commits included, corresponding commit notes, etc.) may be presented via element 811 of the build information tab 805 in the depicted embodiment. The current status of the build (e.g., whether it is in-progress, has succeeded, or has failed) may be presented via element 817, and a "cancel build" button element 813 may be used to abort the build if it has not yet completed. In element 815, an indication of how soon the status information of element 817 is going to be refreshed may be provided in some implementations. In at least some embodiments, a PAT GUI 801 may enable authorized users to view the build status not only of their own builds, but also of builds requested by other users. Element 823 may be used to request status information of other users' requested builds in the depicted embodiment—e.g., in response to a mouse click on element

823, a user may be provided a form field in which a different user's identifier may be entered, and status information pertaining to the specified user's build may be presented using a tab similar to tab 805.

After a requested build succeeds, some of the interface elements presented via tab 805 may be changed in some embodiments, as indicated in view 803. The build link element 811 and the build status element 817 shown in view 802 may remain (with the status being shown as "completed"), while the "cancel build" element 813 may be replaced by a "discard build" element which can be used to delete the newly-created build if the user does not wish to retain it. Generated SVS element 857 may provide the identifier of a new software version set (SVS) corresponding to the created patch build. In element, a URL to a web page that contains information about the differences between the new SVS and the pre-build SVS may be provided in the depicted embodiment. Element 863 may be used to indicate that checkbox 861 is to be used to confirm a QA sign-off, while element 867 may indicate that the user is to confirm, using check box 865, that the new SVS only contains the changes needed for the patch (i.e., that no extraneous changes have been added to the patch beyond those needed to fix the defect being targeted by the patch).

In FIG. 9, example elements of the deploy tab 807 of GUI 801, accessible to a user after a patch build succeeds in some embodiments, are shown. In element 911, a SDDS-generated identifier of the patch may be shown, and an identifier of the pipeline and stage(s) to which the patch is directed may be automatically displayed in element 913. Element 915 may display information about candidate patch target deployment environments associated with the target stages, such as the environment name or identifier, whether the GUI user has permission to deploy to the environment, and/or whether the environment's software version set (SVS) has changed since the pre-build snapshot of the SVS was taken. The user may use check boxes shown in the "Select" column of element 915 to specify the environments to which the patch is to be deployed automatically by the PAT, and submit a request to deploy the patch to the selected environments via element 917.

After a request to deploy the patch is submitted, interface elements similar to those shown in FIG. 10 may be presented to provide information about the requested deployment(s). Elements 911 and 913 may remain as they were shown in FIG. 9, but the environments region 1015 may now show a system-generated deployment identifier and deployment status (e.g., "in-progress", "completed", etc.) of the patch with respect to each of the environments that were selected for deployment earlier. Additional details of the patch build may be provided via elements 1016 (showing an identifier assigned to the patch build), 1017 (showing the identifier of the requester of the patch build), 1019 (showing the identifier of the QA signoff provider) and 1021 (showing the identifier of the person who provided the confirmation that the patch only contains necessary changes for the defect being remediated, as indicated in element 867 of FIG. 8). Each of the elements 1016, 1017, 1019 and 1021 may be automatically filled by the PAT in the depicted embodiment, based on information collected in earlier phases of the patch workflow. It is noted that FIG. 5-FIG. 10 are presented as simple examples of the kinds of interface elements that may collectively be used to help guide the operations of a patch workflow in some embodiments; in other embodiments, different combinations of interface elements may be employed.

Factors Influencing Target Stage Selection

Using the kinds of patch automation techniques and tools introduced above, a software patch for remediating an identified defect or bug may be inserted into any appropriate stage of a pipeline, e.g., typically into one of the stages that the main portion of the software application code has already passed through prior to the stage at which the defect was discovered, or the stage in which the defect was discovered. As mentioned earlier, in some cases patches may be used to introduce incremental features or improvements into an application, and may not necessarily be tied to specific identified defects; multiple options may also be available for introducing such patches. In some cases, multiple stages may be acceptable for inserting a given patch, and tradeoff analysis taking several different factors may be performed to identify the specific target stage (or stages) at which the patch should be introduced. FIG. 11 illustrates example factors that may be taken into account to determine the target stage of a pipeline into which a patch is to be inserted, according to at least some embodiments. In some cases, as mentioned earlier, the patch automation tool may provide recommendations for the stage in which a patch should be inserted, and such recommendations may be based on the automated analysis of such factors.

Example factors 1110 for identifying a target stage of a pipeline may include, among others, a defect impact estimate analysis 1112, a testing breadth requirement analysis 1114, the size of the patch 1116, a production deployment schedule 1118, and/or potential reversion-related analysis 1120 in the depicted embodiment. In addition, the stage at which the defect was identified may also play a role in some embodiments. The defect impact analysis 1112 may indicate how widespread the impact of the defect is, e.g., whether the defect prevents some core functionality of the application from working properly, or whether the defect only prevents a small subset of the application's users from performing one or more types of operations. For example, if the defect is discovered in a production stage of an e-retail web site application, or in a stage very close to the production stage in the pipeline, and the defect slows down the purchase interaction at the e-retail web site, the impact may be deemed severe, and a recommendation that the patch should preferably be deployed in a stage very close to the detection stage may be generated by a patch automation tool.

The testing breadth requirement estimate 1114 may, for example, indicate how varied the testing of the patch should be—e.g., whether the defect has to be tested in a plurality of deployment environments, whether the defect would be evident in manual testing or only in multi-user performance testing, and so on. The wider the requirements for the testing, the earlier in the pipeline the patch may typically have to be inserted in various embodiments; in some cases, the patch may be introduced in multiple stages/environments simultaneously. The size of the patch 1116 (e.g., the number of source code files modified in the patch, or the number of software packages involved) may also influence how early in the pipeline the patch should be introduced in some embodiments; the larger the patch, the earlier the patch may be introduced. The production deployment schedule 1118, i.e., the intended target date at which the version of the application for which the pipeline is being executed may also influence the target stage recommended in some embodiments—e.g., if an important release date is scheduled in the near future, the patch may be more likely to be introduced later in the pipeline.

Potential patch reversion-related analysis 1120 may play an important role in deciding the stages or stages into which a patch should be added in some embodiments. Consider the following example scenario: a pipeline consists of 5 stages, S0 through S4. A defect is identified in stage S3, and a change C1 to a source code file F1 is to be included in a patch P1 for the defect. Based on scheduling considerations, it may make sense to inject P1 into stage S3 itself. If the change C1 is introduced only into stage S3, however, and a conflicting change C2 happens to be made to file F1 at an earlier stage such as S1 (e.g., for a different release of the application), this could eventually lead to the reversion or "cancellation" the patch P1, e.g., when the change C2 progresses through stage S2 and reaches stage S3. In effect, C2 could in principle override C1, thereby removing the benefits associated with P1 from at least some versions of the application. In order to avoid such a reversion in this example, the change C1 may also be introduced as a "back patch" (after the appropriate conflict resolution with C2, if conflict resolution is required) at stage S1, so that the benefits of both changes are retained for the application. In order to be able to identify which stage(s) need C1 to avoid such reversion or overriding, components of an SDDS may examine the records of the changes made at various stages of a pipeline, e.g., to identify potentially overlaps in changed source code. Based on such patch reversion-related analysis, one or more additional target stages for a patch (such as S1 in the above example) may be identified or recommended. Note that as in the example scenario described, multiple target stages may be identified for a given patch P1 may be identified or recommended in some embodiments. Other factors, not shown in FIG. 11, may be considered in some embodiments when determining a recommended target stage.

Methods For Automated Patch Management

Figure 12:
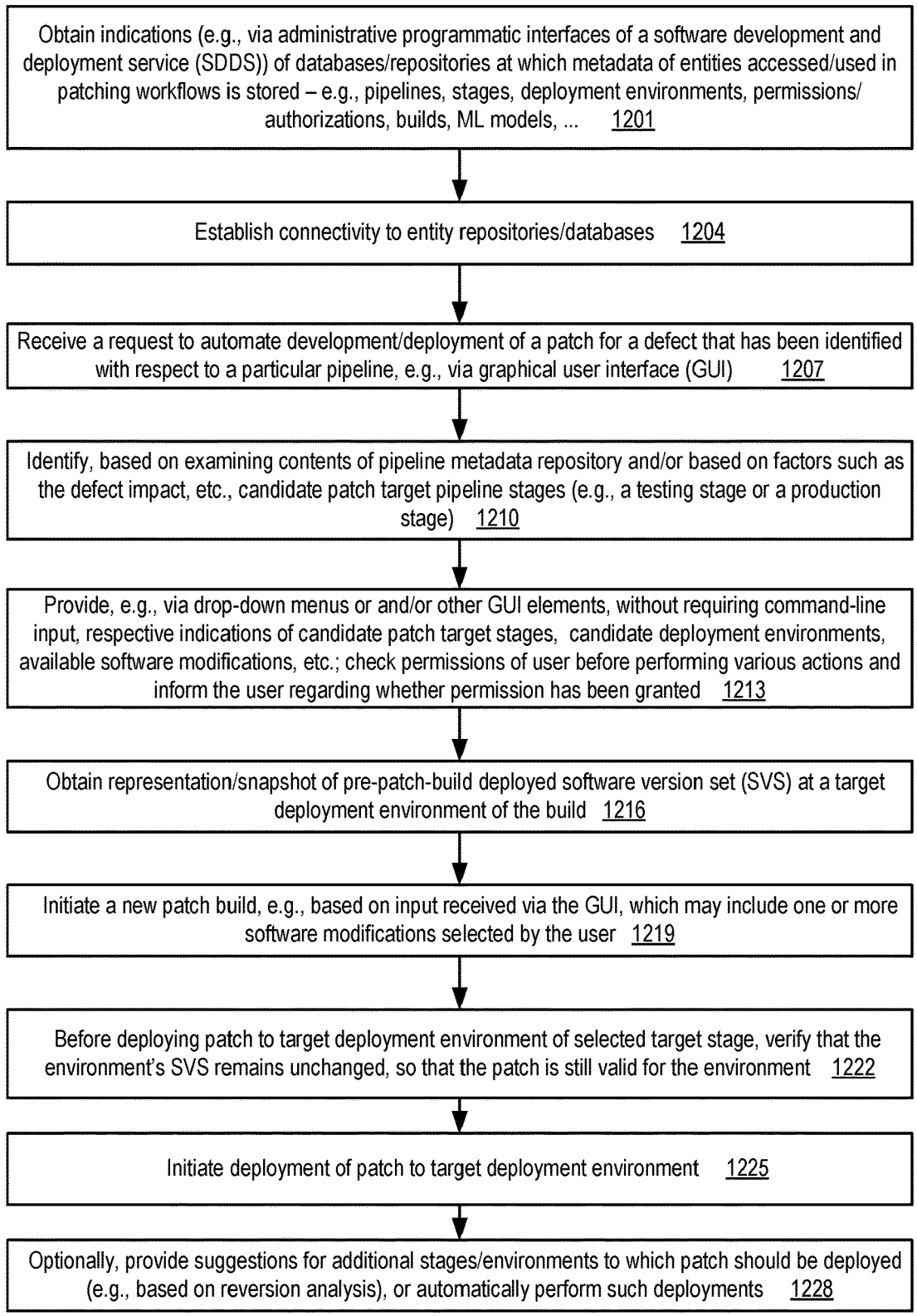
FIG. 12 and FIG. 13 are flow diagrams illustrating aspects of patch management operations that may be performed at a software development and deployment service, according to at least some embodiments.
Figure 13:
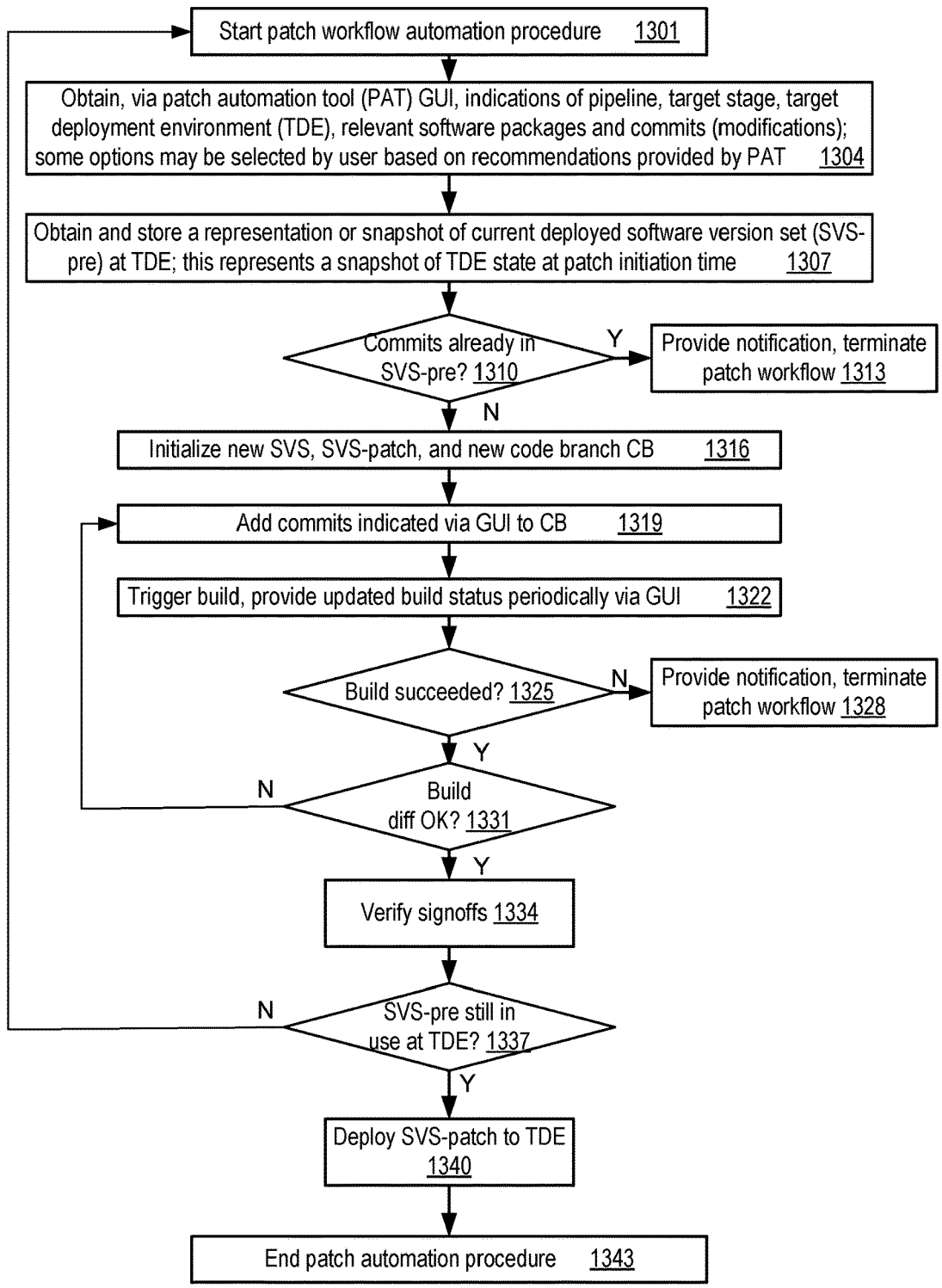

FIG. 12 and FIG. 13 are flow diagrams illustrating aspects of patch management operations that may be performed at a software development and deployment service, according to at least some embodiments. As shown in element 1201, indications of a number of data sources (e.g., database systems or repositories) at which metadata of entities to be accessed during a patch workflow is stored may be obtained, e.g., via administrative programmatic interfaces of a software development and deployment service (SDDS) similar in functionality to SDDS 110 of FIG. 1. For example, data sources comprising pipeline, stage, deployment environment, permissions/authorizations, analytics tools and/or machine learning models and the like may be identified in the obtained indications. Network connectivity to the various data sources may be established from the SDDS (element 1204) in various embodiments, e.g., using credentials/roles that were indicated programmatically by the SDDS client for the data stores.

A request to automate development and deployment of a patch for a defect that has been identified with respect to a particular pipeline (or for an incremental feature) may be obtained, e.g., via a graphical user interface of a patch automation tool (PAT) (element 1207). One or more candidate patch target stages of the pipeline may be identified at the SDDS, e.g., based on examining the contents of one or more of the data stores as well as on factors such as those discussed in the context of FIG. 11 (element 1210); the candidate target stages may for example include one or more testing stages and/or a production stage.

Without requiring command line input, valid options for various choices to be made with respect to the patch may be presented to a PAT user in the depicted embodiment (element 1213). For example, options may be presented via pre-populated drop-down menus, prefix or similarity-based search results, or other similar interface elements for the candidate patch target stages, candidate deployment environments, available software modifications (commits) which can be included in the patch, and so on. Permissions of the PAT user for a given action (e.g., requesting a build or deployment) may be checked by the SDDS prior to enabling the user to perform the action, and an advance indication of whether the user has the required permission may be provided via the PAT interface. In at least some embodiments, if a user does not have permission for a task (e.g., a build or a deployment) that is part of the patch workflow, an interface element enabling a request for the task may not even be provided, thus preventing the user from attempting an operation that would be denied due to lack of permission.

A representation or snapshot of a currently-deployed software version set (SVS), referred to as a pre-patch build at a target deployment environment of the patch may be obtained at the SDDS in the depicted embodiment (element 1216). Based on input obtained via the PAT GUI, a new patch build (which may incorporate one or more of the software modifications that were presented via the GUI and selected for inclusion in the patch) may be initiated (element 1219). Before deploying the patch to the target environment, in at least some embodiments the SDDS may confirm or verify that the software version set (SVS) of the environment has not changed since the snapshot/representation mentioned in the context of element 1216 was obtained. As such, an automated verification of the validity of the patch for the target deployment environment may be performed in such embodiments. After the verification, the deployment of the patch to the target deployment environment may then be initiated (element 1225). Note that if the software state of the target deployment environment is found to be different than indicated in the earlier representation, in at least some embodiments the deployment of the newly-built patch may be disallowed or prohibited by the SDDS. In at least some embodiments, the SDDS may optionally provide suggestions (e.g., using messages displayed via a GUI) for additional stages and/or deployment environments to which the patch should be deployed (element 1228), or even initiate automatic deployment of the patch to such environments and/or stages. In some cases, such additional stages and/or environments may be identified using reversion-related analysis and/or other factors of the kind discussed in the context of FIG. 11.

FIG. 13 illustrates additional details of an automated patch workflow, according to at least some embodiments. A patch workflow automation procedure corresponding to a defect identified at a stage of a software pipeline may be initiated (element 1301). Via a graphical user interface (GUI) or a patch automation tool (PAT) similar in functionality to PAT 128 of FIG. 1, respective indications of parameters the target pipeline, the target state, a target deployment environment (TDE) of the target stage, as well as the software packages and commits to be included in the patch may be obtained, e.g., without requiring commands to be submitted via a command line in the depicted embodiment (element 1304). Some of the choices for the parameters may be selected by a user based on recommendations indicated by the PAT in one embodiment.

A representation or snapshot of the current deployed software version set (i.e., the set of software currently in use) at the target deployment environment of the target stage before the patch build is initiated may be obtained and stored (element 1307) in the depicted embodiment. This snapshot may be referred to as SVS-pre, as it precedes the patch build. Any of a number of different tools or records may be used to obtain such snapshots in different embodiments—e.g., a record of the overall application build that was deployed to the deployment environment earlier, as well as any patches that have been applied since then, may be used to generate a snapshot, or a software inventory tool may be executed at the deployment environment to generate a snapshot.

The PAT may check whether some or all of the selected code modifications or commits of the patch are already present in SVS-pre. If such commits are already present in the deployed version of the software of the target environment (as determined in operations corresponding to element 1310), a notification indicating their presence may be provided and the automation workflow may be terminated (element 1313) in the depicted embodiment. Otherwise, a new software version set, SVS-patch may be initialized and a new code branch CB may be created for the patch contents (element 1316). A subset of commits displayed via the GUI, selected by the user for the patch, may be added to the branch CB (element 1319).

A build operation for the patch may be triggered via a GUI interaction (element 1322), and status information of the build may be displayed via the GUI and updated periodically or on demand in some embodiments. If the build fails for some reason, as detected in operations corresponding to element 1325, a notification may be provided to the PAT user via the GUI, and the patch workflow may be terminated (element 1328). If the build succeeds, as also detected in operations corresponding to element 1325, an operation to determine the difference ("build diff") between the patch build and the baseline build with respect to which the patch was built may be performed in the depicted embodiment, to check that the patch build contains the selected code modifications and does not contain any extraneous code changes. If there are no extraneous changes in the patch build (as detected in operations corresponding to element 1331), one or more signoffs (approvals from entities that have been identified as authorized approvers for the patch) may be obtained programmatically and verified (element 1334). If the build appears to have unwanted or extraneous code changes (as also detected in operations corresponding to element 1331), the GUI may provide an opportunity to the user to resume the workflow with operations corresponding to element 1219, in which commits indicated via the GUI are identified for inclusion in the patch.

After the signoffs are verified in the depicted embodiment, the PAT may initiate a verification operation to check that the state of the target deployment environment has not changed since the SVS-pre snapshot was obtained. If SVS-pre is still in use at the TDE (as detected in operations corresponding to element 1337), the new patch build corresponding to SVS-patch may be deployed to the TDE (element 1340), and the workflow automation procedure for the current patch may be terminated in the depicted embodiment (element 1343). If the software state has changed at TDE, as also determined in operations corresponding to element 1337, the patch workflow automation procedure may be re-started if desired by the PAT user, and operations corresponding to elements 1301 onwards may be performed again.

It is noted that in various embodiments, some of the operations shown in FIG. FIG. 12 and/or in FIG. 13 may be implemented in a different order than that shown in the figure, or may be performed in parallel rather than sequentially. Additionally, some of the operations shown in FIG. 12 and/or in FIG. 13 may not be required in one or more implementations.

Use Cases

The techniques described above, of automating the process of handling software patches that are to be inserted in various stages of a software development and deployment pipeline, may be beneficial in a number of scenarios. Manual selection of code commits for patches, and manual selection of target development environments and stages, may often take a long time and involve the use of command via a command-line interface, which can often lead to errors. As a result, software patches sometimes do not actually resolve the defect for which they were intended, or introduce unnecessary or risky changes to the deployment environment. Furthermore, in some cases various steps of the patch process may have to be repeated after errors are encountered. By using a patch automation tool which connects to data sources such as authorization databases, pipeline metadata repositories, and code bases, pre-checks permissions for various patch related operations and provides easy-to-use graphical user interfaces similar to those described herein, the process of resolving defects identified for complex applications may be speeded up considerably, with fewer resources and time being consumed on average, and fewer errors being introduced.

Illustrative Computer System

Figure 14:
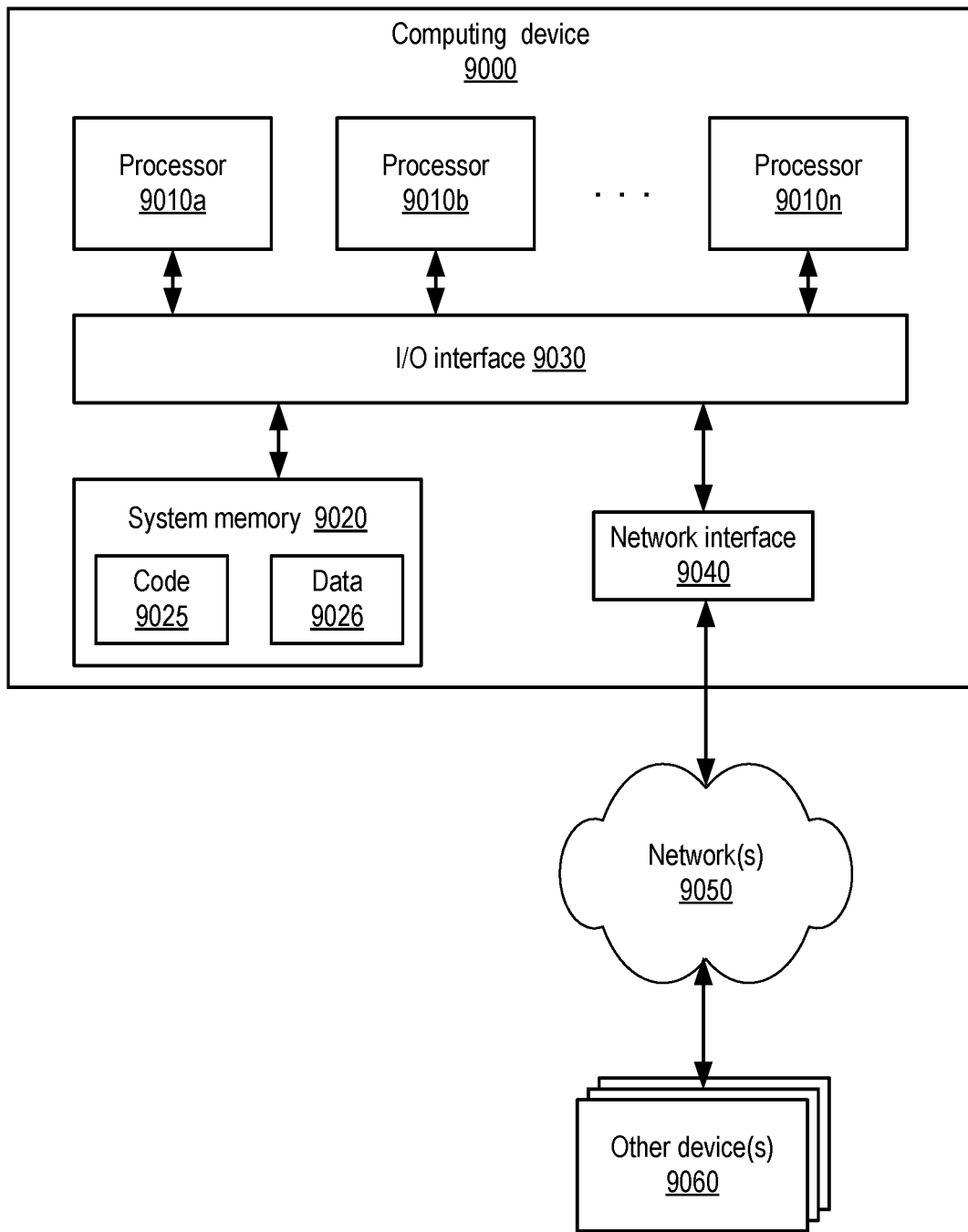
FIG. 14 is a block diagram illustrating an example computing device that may be used in at least some embodiments.

In at least some embodiments, a server that implements a portion or all of one or more of the technologies described herein, including the techniques for various elements of a software development and deployment service at which patch automation tools may be implemented, may include a general-purpose computer system that includes or is configured to access one or more computer-accessible media. FIG. 14 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, or MIPS ISAs, or any other suitable ISA. In multiprocessor systems, each of processors 9010 may commonly, but not necessarily, implement the same ISA. In some implementations, graphics processing units (GPUs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 13, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may be one embodiment of a computer-accessible medium configured to store program instructions and data as described above for FIG. 1 through FIG. 13 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. In some embodiments, a plurality of non-transitory computer-readable storage media may collectively store program instructions that when executed on or across one or more processors implement at least a subset of the methods and techniques described above. A computer-accessible medium may include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 14 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

Conclusion

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system comprising:
one or more computing devices;
wherein the one or more computing devices include instructions that upon execution on or across one or more processors cause the one or more computing devices to:
obtain, via one or more programmatic interactions, respective indications of a software development pipeline metadata repository and a software code repository;
identify, based at least in part on contents of the software development pipeline metadata repository, one or more candidate patch target stages of a software development pipeline other than a beginning stage of the software development pipeline, at which a patch can be injected into a software, wherein the one or more candidate patch target stages include at least one of a testing stage or a production stage;

cause to be presented, via one or more graphical user interfaces, without obtaining command-line input, respective indications of the one or more candidate patch target stages other than the beginning stage, and a plurality of software modifications submitted to the software code repository;

initiate a build, based at least in part on input obtained via the one or more graphical user interfaces that includes selection of a patch target stage of the one or more candidate patch target stages other than the beginning stage, of a first software patch comprising at least a first software modification of the plurality of software modifications;

verify whether a version of a currently deployed software has changed since a first snapshot of a deployment environment of the currently deployed software was obtained, wherein said verify is performed prior to deployment of the first software patch to the deployment environment corresponding to the selected patch target stage, and wherein said verify is based on a comparison of the first snapshot, obtained at or prior to a time of the initiation of the build of the first software patch, to a second snapshot of the deployment environment of the currently deployed software currently deployed at the deployment environment;

for a failed verification indicating that the version of the currently deployed software has changed since the first snapshot was obtained, prohibit the deployment of the first software patch to the deployment environment; and for a positive verification indicating that the version of the currently deployed software has not changed since the first snapshot was changed, initiate the deployment of the first software patch to the deployment environment.

2. The system as recited in claim 1, wherein at least one computing device of the one or more computing devices is located at a data center of a provider network, and wherein at least one repository of the software development pipeline metadata repository or the software code repository is located at a premise external to the provider network.

3. The system as recited in claim 1, wherein the one or more computing devices include further instructions that upon execution on or across the one or more processors further cause the one or more computing devices to:

determine, before causing an interface element usable to submit a patch related command to be presented to a user of a graphical user interface, whether the user has permission to execute the patch related command; and cause, to be provided via the graphical user interface, a message indicating whether the user has the permission.

4. The system as recited in claim 1, wherein the one or more computing devices include further instructions that upon execution on or across the one or more processors further cause the one or more computing devices to:

identify, based at least in part on respective results of one or more queries directed to one or more repositories, a set of valid options for a text entry element of a graphical user interface of the one or more graphical user interfaces; and cause the set of valid options to be presented via the graphical user interface.

5. The system as recited in claim 1, wherein the one or more computing devices include further instructions that upon execution on or across the one or more processors further cause the one or more computing devices to:

establish, using credential information obtained in the one or more programmatic interactions, network connectivity with at least one repository of the software development pipeline metadata repository or the software code repository.

6. A method, performed at one or more computing devices, comprising:

obtaining, via one or more programmatic interactions, respective indications of a software development pipeline metadata repository comprising a representation of at least a first pipeline, and a software code repository;

causing to be presented, via a graphical user interface and for initiation of a patch for a software, respective indications of one or more candidate patch target stages, other than a beginning stage, of the first pipeline at which the patch can be injected into the software, and one or more software modifications submitted to the software code repository;

verifying whether a version of a currently deployed software for which the patch is initiated has changed since a first snapshot of a state of the currently deployed software at a selected patch target stage of the one or more candidate patch target stages was obtained, wherein said verifying is performed prior to deployment of the patch to the selected patch target stage, and wherein said verifying is based on a comparison of the first snapshot, obtained at or prior to a time of initiation of a build of the patch, to a second snapshot of the state of the currently deployed software at the selected patch target stage;

for a failed verification that indicates that the version of the currently deployed software has changed since the first snapshot was obtained, prohibiting the deployment of the patch to the selected patch target stage; and for a positive verification that indicates that the version of the currently deployed software has not changed since the first snapshot was obtained, initiating the deployment of the patch to the selected patch target stage.

7. The method as recited in claim 6 further comprising:

determining, before causing an interface element usable to submit a patch related command to be presented to a user of the graphical user interface, whether the user has permission to execute the patch related command; and causing, to be provided via the graphical user interface, a message indicating whether the user has the permission.

8. The method as recited in claim 7, wherein the patch related command comprises one or more of: a command to initiate the build of the patch, a command to initiate the deployment of the patch or adding code to a package.

9. The method as recited in claim 6 further comprising:

determining, using one or more of authorization data, coding activity data, pipeline ownership data, or defect queue data, that a first set of interface elements is to be presented to a particular user of the graphical user interface, wherein the first set of interface elements includes an element to submit a particular patch related command; and determining, using the one or more of the authorization data, the coding activity data, the pipeline ownership data, or the defect queue data, that a second set of interface elements is to be presented to another user of the graphical user interface, wherein the second set of interface elements does not include the element to submit the particular patch related command.

10. The method as recited in claim 6 further comprising:
transmitting, to a permissions owner, a message indicating that a current user of the graphical user interface does not have a permission to initiate a patch related operation; and
obtaining, from the permissions owner, an indication that the current user has been granted the permission to initiate the patch related operation.

11. The method as recited in claim 6 further comprising:
causing to be provided, via the graphical user interface, an indication of a recommended patch target stage for a particular patch.

12. The method as recited in claim 6 further comprising:
identifying a recommended patch target stage for a particular patch based at least in part on one or more of: a deployment schedule of an application for which the patch is generated, an impact analysis of a defect to be remediated by the patch, a testing requirement estimate associated with the patch, a size of the patch or patch reversion analysis.

13. The method as recited in claim 6 further comprising:
causing to be provided, using the graphical user interface, an applicability estimate of a software code change to a defect.

14. The method as recited in claim 6 further comprising:
determining, using a search operation which is not an exact match search, a set of candidate options corresponding to at least entry element of the graphical user interface.

15. The method as recited in claim 6 further comprising:
causing, based at least in part on analysis of input obtained via the graphical user interface, an update of an entry at a defect tracking database.

16. One or more non-transitory computer-accessible storage media storing program instructions that when executed on or across one or more processors cause one or more computer systems to:
cause to be presented, via a graphical user interface and for initiation of a patch for a software, an indication of one or more candidate patch target stages, other than a beginning stage, of a first software development pipeline at which the patch can be injected into the software;
verify whether a version of a currently deployed software for which the patch is initiated has changed since a first record of a state of the deployed software at a selected patch target stage of the one or more candidate patch target stages was obtained, wherein said verify is performed prior to deployment of the patch to the selected patch target stage, and wherein said verify is based on a comparison of
the first record, obtained at or prior to a time of initiation of a build of the patch, to
a second record of the state of the currently deployed software at the selected patch target stage;
for a failed verification indicating that the version of the currently deployed software has changed since the first record was obtained, prohibit the deployment of the patch; and
for a positive verification indicating that the version of the currently deployed software has not changed since the first record was obtained, initiate the deployment of the patch to the selected-patch target stage.

17. The one or more non-transitory computer-accessible storage media as recited in claim 16, storing further program instructions that when executed on or across the one or more processors further cause the one or more computer systems to:
determine, before causing an interface element to submit a patch related command to be presented to a user of the graphical user interface, whether the user has permission to execute the patch related command; and
cause, to be provided via the graphical user interface, a message indicating whether the user has the permission.

18. The one or more non-transitory computer-accessible storage media as recited in claim 16, storing further program instructions that when executed on or across the one or more processors further cause the one or more computer systems to:
collect and store one or more patch related metrics; and
provide, in response to a metric request received via a programmatic interface, at least one patch-related metric of the one or more patch-related metrics.

19. The one or more non-transitory computer-accessible storage media as recited in claim 16, storing further program instructions that when executed on or across the one or more processors further cause the one or more computer systems to:
determine, using one or more of authorization data, coding activity data, pipeline ownership data, or defect queue data, that a first set of interface elements is to be presented to a particular user of the graphical user interface, wherein the first set of interface elements includes an element to submit a particular patch related command; and
determine, using the one or more of the authorization data, the coding activity data, the pipeline ownership data, or the defect queue data, that a second set of interface elements is to be presented to another user of the graphical user interface, wherein the second set of interface elements does not include the element to submit the particular patch related command.

20. The one or more non-transitory computer-accessible storage media as recited in claim 16, storing further program instructions that when executed on or across the one or more processors further cause the one or more computer systems to:
obtain, via the graphical user interface, an indication of a user authorized to initiate one or more types of patch related operations; and
cause, to be presented via the graphical user interface, an indication of a status of a patch related operation initiated by the user.

* * * * *